United States Patent
Okoshi et al.

(10) Patent No.: US 12,330,683 B2
(45) Date of Patent: Jun. 17, 2025

(54) COMPUTING DEVICE, VEHICLE-MOUNTED DEVICE, AND AUTONOMOUS DRIVING SYSTEM

(71) Applicant: HITACHI, LTD., Tokyo (JP)

(72) Inventors: Kyoko Okoshi, Tokyo (JP); Takashi Nomura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 216 days.

(21) Appl. No.: 17/275,389

(22) PCT Filed: Aug. 26, 2020

(86) PCT No.: PCT/JP2020/032218
§ 371 (c)(1),
(2) Date: Mar. 11, 2021

(87) PCT Pub. No.: WO2021/106295
PCT Pub. Date: Jun. 3, 2021

(65) Prior Publication Data
US 2021/0316760 A1  Oct. 14, 2021

(30) Foreign Application Priority Data
Nov. 27, 2019 (JP) .................... 2019-214763

(51) Int. Cl.
*B60W 60/00* (2020.01)
*B60W 40/09* (2012.01)
(Continued)

(52) U.S. Cl.
CPC ........ *B60W 60/0018* (2020.02); *B60W 40/09* (2013.01); *B62D 15/021* (2013.01);
(Continued)

(58) Field of Classification Search
CPC ............. B60W 60/0018; B60W 40/09; B60W 2552/53; B60W 2554/4045;
(Continued)

(56) References Cited

U.S. PATENT DOCUMENTS

2016/0139594 A1  5/2016  Okumura et al.
2016/0221584 A1* 8/2016  Fendt .................... B60W 50/04
(Continued)

FOREIGN PATENT DOCUMENTS

JP  2018-148284 A  9/2018
JP  2018-155894 A  10/2018
(Continued)

OTHER PUBLICATIONS

International Search Report of PCT/JP2020/032218 dated Nov. 2, 2020.
(Continued)

*Primary Examiner* — Jelani A Smith
*Assistant Examiner* — Gabriel Anfinrud
(74) *Attorney, Agent, or Firm* — MATTINGLY & MALUR, PC

(57) ABSTRACT

A computing device includes a server communication that receives, from a vehicle-mounted device in a first vehicle, information about a position of interruption in autonomous driving and receives, from a vehicle-mounted device in a second vehicle, information about manual driving of the second vehicle in a region of the interruption position. A control point is extracted from the manual driving information in the region of the interruption position as a spot related to a change of a running direction, and knowledge information is created containing running information that is a speed or a steering angle of a vehicle on a trajectory passing through the control point. Also received is knowledge information enabling generation of a track for changing a running (Continued)

direction of a vehicle. The knowledge information and information indicating a trajectory of a vehicle generated using the knowledge information is transmitted to a vehicle-mounted device of a vehicle.

18 Claims, 15 Drawing Sheets

(51) Int. Cl.
  *B62D 15/02* (2006.01)
  *G06N 5/022* (2023.01)
(52) U.S. Cl.
  CPC .......... *G06N 5/022* (2013.01); *B60W 2552/53* (2020.02); *B60W 2554/4045* (2020.02)
(58) Field of Classification Search
  CPC .......... B60W 2555/60; B60W 2556/45; B60W 60/0015; B60W 60/001; B60W 30/10; B60W 40/02; B62D 15/021; B62D 15/0255; B62D 15/025; G06N 5/022; G08G 1/09; G08G 1/16; G09B 29/10; G05D 1/80
  See application file for complete search history.

(56) References Cited

U.S. PATENT DOCUMENTS

| | | | |
|---|---|---|---|
| 2019/0086916 A1* | 3/2019 | Choi | G05D 1/0061 |
| 2019/0106120 A1* | 4/2019 | Hatano | B60W 30/00 |
| 2019/0385444 A1 | 12/2019 | Inoue et al. | |
| 2020/0084955 A1* | 3/2020 | Kreider | A01B 79/005 |
| 2020/0239030 A1 | 7/2020 | Kwoczek et al. | |

FOREIGN PATENT DOCUMENTS

| | | |
|---|---|---|
| JP | 2019-180051 A | 10/2019 |
| JP | 2020-122789 A | 8/2020 |
| WO | 2017/057528 A1 | 4/2017 |
| WO | 1017/179151 A1 | 10/2017 |
| WO | 2017/179151 A1 | 10/2017 |

OTHER PUBLICATIONS

Chinese Office Action received in corresponding Chinese Application No. 202080004840.9 dated Jan. 6, 2024.
Extended European Search Report received in corresponding European Application No. 20855844.5 dated Mar. 21, 2024.

* cited by examiner

FIG.3

| NUMBER | VEHICLE TYPE | DATE AND TIME | INTERRUPTION POSITION | FIRST NODE | SECOND NODE | RUNNING COORDINATES | AUTONOMOUS DRIVING CONTROL POINT |
|---|---|---|---|---|---|---|---|
| 1-01 | 11111 | 2019-0123-0900 | (φ801, λ801) | N950 | N959 | (φ911, λ911) | NONE |
| 1-02 | | | | | | (φ922, λ922) | (φ952, λ952) |
| 1-03 | | | | | | (φ933, λ933) | NONE |
| ⋮ | | | | | | ⋮ | ⋮ |
| 2-01 | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

FIG.4

| INTERRUPTION POSITION | FACTOR ID | DATE AND TIME | VEHICLE TYPE | RUNNING COORDINATES 1 | RUNNING COORDINATES 2 | ·· |
|---|---|---|---|---|---|---|
| (φ801、λ801) | A1 | 2019-0123-0900 | 11111 | (φ901、λ901) | (φ902、λ902) | |

1531 1532 1533 1534 1535 153

COMPUTING DEVICE, VEHICLE-MOUNTED DEVICE, AND AUTONOMOUS DRIVING SYSTEM

TECHNICAL FIELD

The present invention relates to a computing device, a vehicle-mounted device, and an autonomous driving system.

BACKGROUND ART

In recent years, an autonomous driving technology using map data has been gradually put into practical use. The current autonomous driving technology uses not only sensor information but also the map data to correct a position of a vehicle and to serve as look-ahead data about running route road information, and the map data needs high accuracy compared with conventional map data for a car navigation system. However, even with a sufficiently highly accurate map prepared, autonomous driving is often interrupted by various factors. Patent Document 1 discloses a vehicle control system including a data processing apparatus that generates and delivers reference information to be referred to by an autonomous driving vehicle for executing autonomous driving, and the autonomous driving vehicle that refers to the reference information acquired from the data processing apparatus to execute autonomous driving. The data processing apparatus includes a running history information acquisition section that acquires running history information from a plurality of vehicles, a reference information generation section that generates, from the running history information acquired by the running history information acquisition section, reference information in which vector information representing a path on which the plurality of vehicles have run is made to correspond to attribute information related to the path represented by the vector information, and a reference information distribution section that distributes the reference information generated by the reference information generation section to the autonomous driving vehicle. The autonomous driving vehicle includes a reference information acquisition section that acquires the reference information from the data processing apparatus, and a control section that executes autonomous driving along the path represented by the reference information.

PRIOR ART DOCUMENT

Patent Document

Patent Document 1: JP-2018-155894-A

SUMMARY OF THE INVENTION

Problem to be Solved by the Invention

The invention described in Patent Document 1 does not sufficiently cope with spots where the autonomous driving is difficult to be executed. For example, the technology described in Patent Document 1 does not take into consideration an appropriate path at a spot where the autonomous driving is frequently disabled due to circumstances such as a positional relation between a road and surrounding vehicles; thus, the autonomous driving is possibly difficult to continue.

Means for Solving the Problem

A computing device according to a first aspect of the present invention includes a server communication section that receives, from a vehicle-mounted device mounted in a first vehicle, information about an interruption position as a position of interruption in autonomous driving and receives, from a vehicle-mounted device mounted in a second vehicle different from the first vehicle, manual driving information as information about manual driving of the second vehicle in a region of the interruption position, an extraction section that extracts, from the manual driving information in the region of the interruption position, a control point as a spot related to a change of a running direction, and a creation section that creates knowledge information containing running information that is a speed or a steering angle of a vehicle on a trajectory passing through the control point, the knowledge information enabling generation of a track for changing a running direction of a vehicle. The server communication section further transmits at least one of the knowledge information and information indicating a trajectory of a vehicle generated using the knowledge information to a vehicle-mounted device of a vehicle.

A vehicle-mounted device according to a second aspect of the present invention includes a recording section that records information about an interruption position as a position of interruption in autonomous driving and manual driving information as information about manual driving after the interruption in the autonomous driving, an extraction section that extracts a control point as a spot related to a change of a running direction by using the manual driving information, a creation section that creates knowledge information enabling generation of a track for changing the running direction of a vehicle on the basis of the control point, and a track generation section that generates a track of the vehicle by using the knowledge information.

An autonomous driving system according to a third aspect of the present invention includes a plurality of vehicle-mounted devices mounted in respective vehicles and a server that communicates with the vehicle-mounted devices.

Each of the vehicle-mounted devices includes a vehicle-mounted communication section that transmits information about an interruption position as a position of interruption in autonomous driving and manual driving information as information about manual driving after the interruption in the autonomous driving of any of the vehicles.

The server includes a server communication section that receives, from the vehicle-mounted devices, the information about the interruption position and the manual driving information, an extraction section that extracts, from the manual driving information, a control point as a spot related to a change of a running direction, a creation section that creates knowledge information enabling generation of a track for changing a running direction of a vehicle on the basis of the control point, and a transmission section that transmits at least one of the knowledge information and information indicating a trajectory of a vehicle generated using the knowledge information to the vehicle-mounted device of any of the vehicles.

Advantage of the Invention

According to the present invention, it is possible to provide information that enables autonomous driving at a spot of previous interruption in the autonomous driving.

BRIEF DESCRIPTION OF THE DRAWINGS

FIG. 3 is a diagram depicting an example of a knowledge DB.

FIG. 4 is a diagram depicting an example of interruption information.

MODES FOR CARRYING OUT THE INVENTION

First Embodiment

An autonomous driving system including a vehicle-mounted device and a server according to a first embodiment will be described hereinafter with reference to FIGS. 1 to 11.

(Definition of Terms)

In the present embodiment, a vehicle on which a vehicle-mounted device having configurations and operations to be described is mounted is referred to as a "subject vehicle." A person sitting in the subject vehicle is referred to as a "user." In the present embodiment, a combination of a latitude and a longitude is referred to as "absolute coordinates." Furthermore, in the present embodiment, a "path" is path information at such a resolution that a road along which a vehicle passes can be located, and is, for example, a line of identifiers of nodes or links in an order in which the subject vehicle runs.

In the present embodiment, "autonomous driving" indicates a state in which at least one of a driving source such as an engine and a motor, a braking device, and a steering wheel is controlled by computing processing. Furthermore, "manual driving" indicates a state in which a vehicle is moving and in which driving is not autonomous driving. "Manual interruption" in the autonomous driving indicates that a user intervenes in an autonomous driving area in an autonomous driving state. In a case, for example, in which the definition of autonomous driving is control over the driving source and the braking device, a user's behavior of stepping on an accelerator pedal or a brake pedal corresponds to the manual interruption in the autonomous driving.

In the present embodiment, a "track" is information about positions with a resolution sufficient to realize the autonomous driving, and is, for example, a line of a plurality of absolute positions with a resolution in the order of millimeters in an order in which a vehicle is to run from now on. In the present embodiment, a "trajectory" indicates a line of absolute position along which a vehicle actually ran in an order in which the vehicle ran. In other words, the "trajectory" indicates positions along which a vehicle previously ran while the "track" indicates positions along which a vehicle is estimated to run.

(Hardware Configuration)

Figure 1:
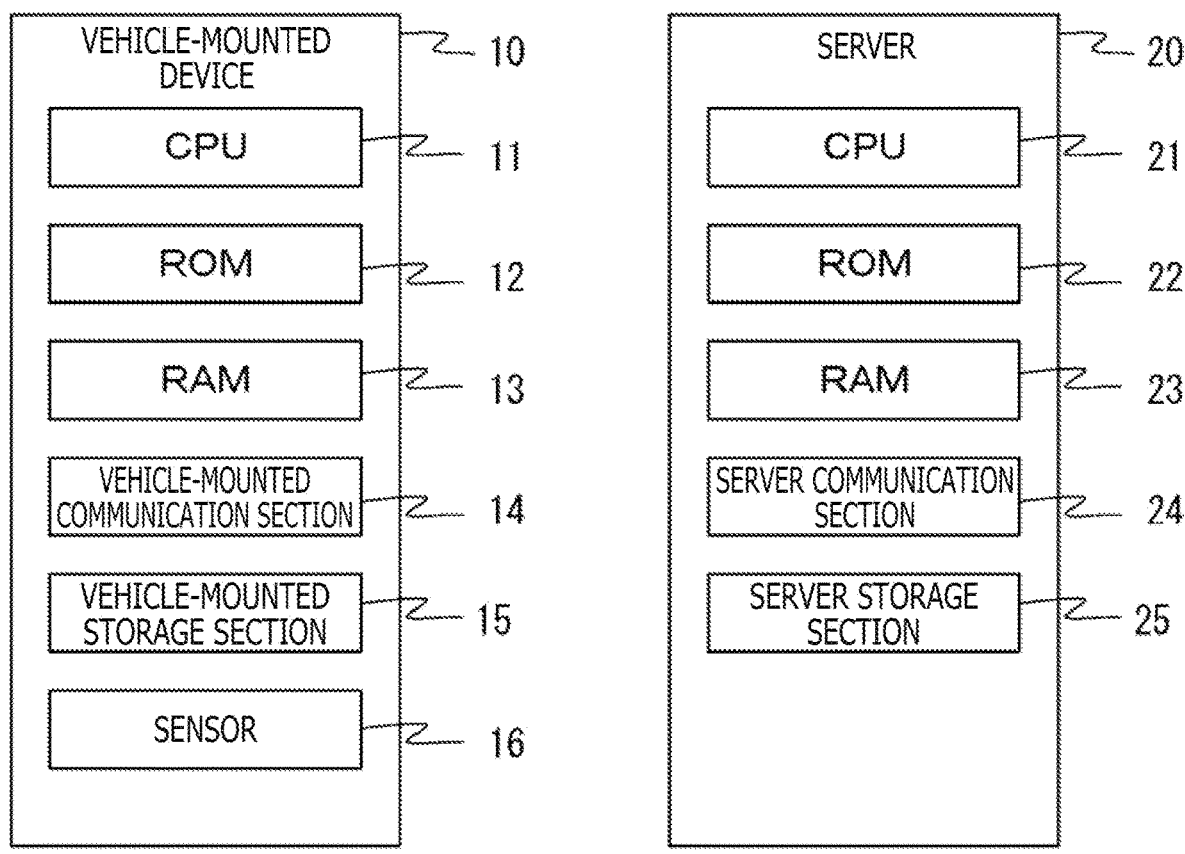
FIG. 1 is a hardware configuration diagram of an autonomous driving system.
Figure 1:
Figure 1:
Figure 1:

FIG. 1 is a diagram depicting a hardware configuration of an autonomous driving system S according to the present embodiment. The autonomous driving system S is configured with vehicle-mounted devices 10 respectively mounted in a plurality of vehicles, and a server 20 that communicates with each of the vehicle-mounted devices 10. The vehicle-mounted devices 10 have a common configuration to be described hereinafter. It is noted, however, the vehicle-mounted devices 10 may differ from each other in configuration by having elements other than the configuration described hereinafter. While the vehicle-mounted devices 10 and the server 20 are described hereinafter each as one device, the vehicle-mounted devices 10 and the server 20 may each include a plurality of devices.

The vehicle-mounted device 10 is configured with a CPU 10 that is a central processing unit, a ROM 12 that is a storage device dedicated to reading, a RAM 13 that is a readable-writable storage device, a vehicle-mounted communication section 14, a vehicle-mounted storage section 15, and a sensor 16. A plurality of functions to be described later are realized by causing the CPU 11 to load programs stored in the ROM 12 to the RAM 13 and to execute the programs. It is noted, however, that the plurality of functions may be realized by an FPGA (Field Programmable Gate Array) that is a programmable logical circuit or an ASIC (Application Specific Integrated Circuit) that is an integrated circuit for specific applications as an alternative to a combination of the CPU 11, the ROM 12, and the RAM 13. Furthermore, the vehicle-mounted device 10 may be configured with a combination of different configurations, for example, a combination of the CPU 11, the ROM 12, the RAM 13, and the FPGA as an alternative to the combination of the CPU 11, the ROM 12, and the RAM 13.

The vehicle-mounted communication section 14 is a communication module capable of wireless communication and configured to communicate with the server 20. While a communication standard with which the vehicle-mounted communication section 14 is compliant is not limited to a specific one, the vehicle-mounted communication section 14 is compliant with, for example, any of 3G, 4G, and 5G. The vehicle-mounted communication section 14 may be connected to the server 20 either directly or via a base station provided by a communication carrier or the Internet. The vehicle-mounted storage section 15 is a nonvolatile storage device which is, for example, a flash memory. The sensor 16 is one or a plurality of sensors that collect information about surroundings of the subject vehicle. The sensor 16 is, for example, a camera and a laser range finder. The information acquired by the sensor 16 is used for recognition of road compartment lines and detection of obstacles.

The server 20 is configured with a CPU 21 that is a central processing unit, a ROM 22 that is a storage device dedicated to reading, a RAM 23 that is a readable-writable storage device, a server communication section 24, and a server storage section 25. A plurality of functions to be described later are realized by causing the CPU 21 to load programs stored in the ROM 22 to the RAM 23 and to execute the programs. It is noted, however, that the plurality of functions may be realized by the FPGA or the ASIC as an alternative to a combination of the CPU 21, the ROM 22, and the RAM 23. Furthermore, the server 20 may be configured with a combination of different configurations, for example, a combination of the CPU 21, the ROM 22, the RAM 23, and the FPGA as an alternative to the combination of the CPU 21, the ROM 22, and the RAM 23.

The server communication section 24 communicates with the vehicle-mounted communication section 14. The server communication section 24 may communicate with the vehicle-mounted communication section 14 either directly or via another device such as a base station or another communication device. The server storage section 25 is a nonvolatile storage device which is, for example, a hard disk drive.

(Functional Configuration)

Figure 2:
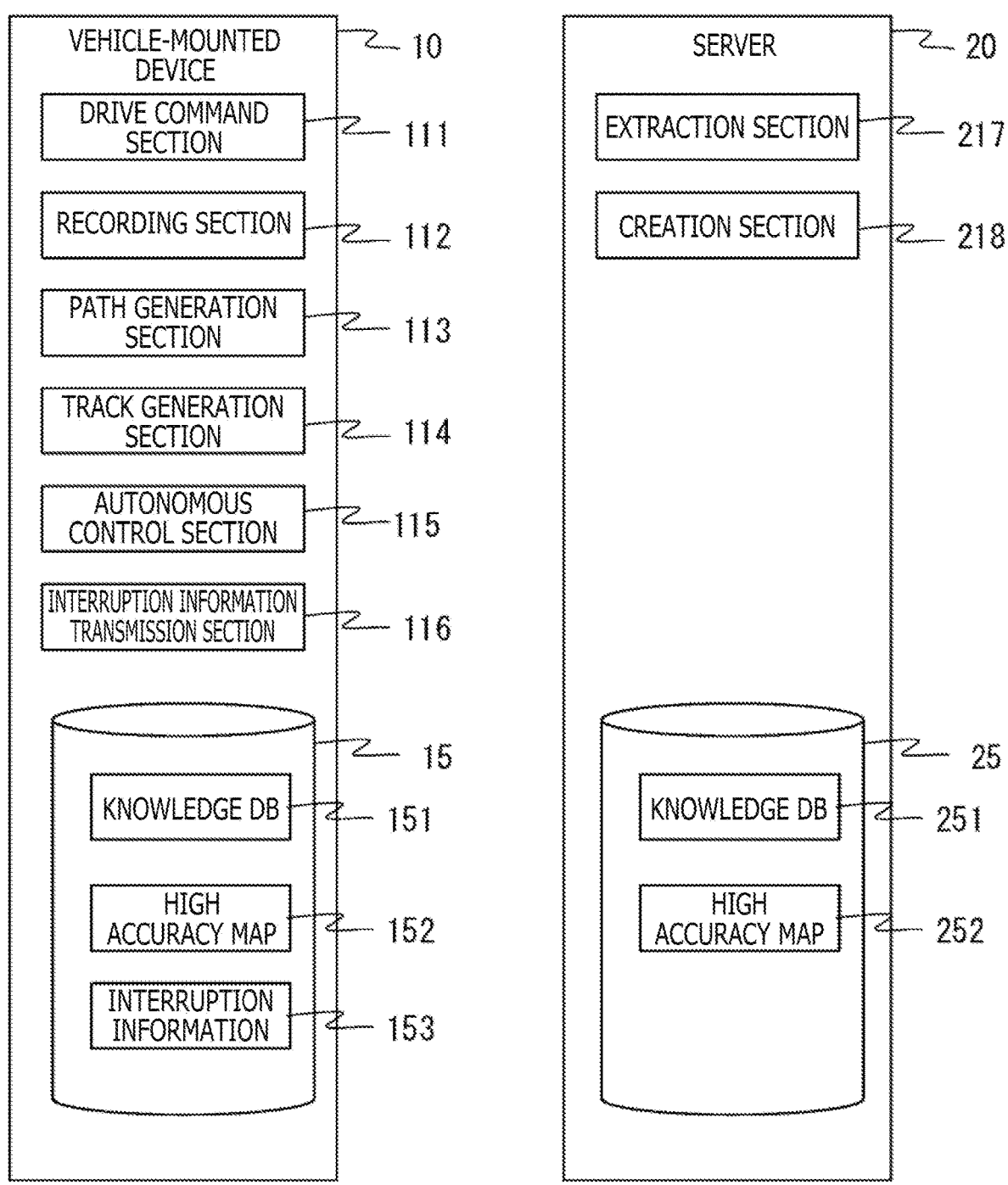
FIG. 2 is a functional block diagram of the autonomous driving system.

FIG. 2 is a functional block diagram representing functions of the autonomous driving system S as blocks. It is noted, however, that FIG. 2 also depicts data. The vehicle-mounted device 10 is configured with, as functions thereof, a drive command section 111, a recording section 112, a path generation section 113, a track generation section 114, an autonomous control section 115, and an interruption information transmission section 116. The drive command section 111 drives a driving source, a braking device, and a steering device of the subject vehicle on the basis of a user's operation and an operation command from the autonomous control section 115. Examples of the user's operation include rotation of a steering wheel, stepping-on of an acceleration pedal, and stepping-on of a brake pedal.

The recording section 112 records information about recording of running of the subject vehicle (hereinafter, referred to as "running information") in the RAM 13. The running information is information that enables a track along which the subject vehicle runs to be calculated ex post facto, and is, for example, a list of absolute positions of a vehicle aligned in an order in which the vehicle runs along the track. Moreover, the running information may be information about a speed and a steering angle of the vehicle per clock time. Furthermore, the running information may be sensor information such as camera sensor information, laser sensor information, and LiDAR sensor information. The recording section 112 records the running information at least in a case in which manual driving is ongoing. In other words, the recording section 112 may or may not record the running information in a case in which autonomous driving is ongoing. The running information contains information regarding a period from interruption of the autonomous driving and start of the manual driving until running, by the subject vehicle, for a predetermined time period, for example, ten seconds, or a predetermined distance, for example, 100 meters.

The path generation section 113 calculates a path along which the subject vehicle runs. The path generation section 113 calculates, for example, a path from a current position to a user's designated destination. The path generation section 113 may generate a plurality of paths, present the paths to the user, and output information about the path selected by the user to the autonomous control section 115, or may generate only one path and output information about the path to the autonomous control section 115 without waiting for user's selection.

The track generation section 114 calculates a track along which the subject vehicle runs. The track generation section 114 calculates a track between designated nodes while referring to a high accuracy map and a knowledge DB 151. Out of the two nodes used for the track generation section 114 to calculate the track, the node closer to a spot of departure will be referred to as a "first node," and the node closer to the destination will be referred to as a "second node," hereinafter.

The autonomous control section 115 starts autonomous driving of a subject vehicle 9 on the basis of a user's operation. The autonomous control section 115 ends the autonomous driving in any of the following cases. In other words, the autonomous control section 115 ends the autonomous driving in a case in which the subject vehicle 9 arrives at the destination, in a case in which the user intervenes in the autonomous driving during the autonomous driving for manual interruption in the autonomous driving, or in a case in which the autonomous control section 115 itself spontaneously determines that it is appropriate to end the autonomous driving (hereinafter, referred to as a "spontaneous interruption") by using the information acquired by the sensor 16. The manual interruption in the autonomous driving and the spontaneous interruption in the autonomous driving by the autonomous control section 115 itself will collectively be referred to as a "forced interruption" in the autonomous driving, hereinafter. Examples of the case in which the autonomous control section 115 itself determines that it is appropriate to end the autonomous driving include a case in which it is impossible to maintain a running path along which the vehicle is scheduled to run and a case in which the vehicle is incapable of reaching the running path.

Furthermore, when a forced interruption in the autonomous driving occurs, the autonomous control section 115 outputs a factor ID indicating a factor of occurrence of the interruption. Referring to this factor ID makes it possible to analyze ex post facto not only whether or not the interruption is a spontaneous interruption but also a reason for occurrence of the spontaneous interruption.

When the recording section 112 has completed recording of the running information, the interruption information transmission section 116 transmits absolute coordinates of occurrence of the forced interruption, the factor ID indicating the factor of the forced interruption, the running information recorded by the recording section 112, a type of the subject vehicle, and current date and time to the server 20 as interruption information 153. While FIG. 2 illustrates that the interruption information 153 is stored in the vehicle-mounted storage section 15 for the sake of convenience, the interruption information 153 may be stored in the RAM 13. Furthermore, the interruption information transmission section 116 may transmit the interruption information 153 to the server 20 by segmenting the interruption information 153 and sequentially transmitting segments that can be transmitted, without storing the entire interruption information 153 in the RAM 13.

It is noted that, other than the case in which the autonomous driving is interrupted, the recording section similarly records running information also in a case, for example, in which the manual driving is ongoing from the beginning by user's own selection to drive the vehicle himself/herself (hereinafter, referred to as "real manual driving"). Owing to this, the interruption information transmission section 116 transmits also records of the real manual driving to the server 20 as the interruption information 153. It is to be noted, however, that in the case of the real manual driving, the interruption in the autonomous driving does not occur; thus, values indicating, for example, empty sets are used as the coordinates of occurrence of the forced interruption and the factor ID indicating the factor of the forced interruption that configure the interruption information 153.

The server 20 is configured with an extraction section 217 and a creation section 218 as functions thereof. The extraction section 217 calculates a trajectory along which the vehicle ran, using the running information received from the vehicle-mounted device 10, and extracts a control point that is a point of intersection between the trajectory and a road compartment line. Specifically, the extraction section 217 calculates absolute coordinates of the control point. The creation section 218 calculates an autonomous driving control point, to be described later, by using the control point extracted by the extraction section 217, generates a track of the vehicle, and creates a new record in the knowledge DB 251. While details are described later, operations of the extraction section 217 and the creation section 218, that is, extraction of the control point and calculation of the autonomous driving control point, are performed by two methods including a first mode and a second mode. Whether the extraction section 217 and the creation section 218 operate in the first mode or the second mode is set by, for example, an operator of the server 20 in advance. The operations of the extraction section 217 and the creation section 218 will be described later by referring to specific examples. The server communication section 24 transmits the knowledge DB 251 to all the vehicle-mounted devices 10 at any timing, for example, at intervals of a certain time period or every time a new record is added to the knowledge DB 251.

(Data Configuration)

The knowledge DB 151, the high accuracy map 152, and the interruption information 153 are stored in the vehicle-mounted storage section 15. The knowledge DB 251 and a high accuracy map 252 are stored in the server storage section 251. Since the knowledge DB 151 is identical in configuration to the knowledge DB 251, the configuration of the knowledge DB 151 will be described hereinafter to represent the two knowledge DBs 151 and 251.

The knowledge DB 151 is a database for complementing the autonomous driving, created by the server 20. The knowledge DB 151 is configured from a plurality of records, and each record configuring the knowledge DB 151 is also referred to as "knowledge information," hereinafter. In other words, the knowledge DB 151 is an aggregate of knowledge information. It is noted that the knowledge information may contain information generated on the basis of data obtained by a sensor such as a camera or a laser range finder. The knowledge DB 151 stores therein information for realizing the autonomous driving in spots where the autonomous driving was previously interrupted. Specifically, information about a track from a first node to a second node suited for the autonomous driving is stored in the knowledge DB 151 for each of a plurality of spots. Each record in the knowledge DB 151 may contain limitations of the vehicle type and the date and time. Furthermore, each record in the knowledge DB 151 may contain execution conditions generated by determining surrounding information about a mobile body or the like on the basis of sensor information such as camera sensor information, laser sensor information, and LiDAR sensor information. Examples of the execution conditions include a condition under which the subject vehicle runs in a left drivable space depending on the path in a case in which a vehicle is present forward of the subject vehicle, a line of vehicles is present to be close on a right side, and a drivable space is present on a left side. Referring to the knowledge DB 151 enables the track generation section 114 to generate a track along which the autonomous driving is not interrupted even at a spot where the autonomous driving is interrupted with an existing track generation scheme.

FIG. 3 is a diagram depicting an example of the knowledge DB 151. The knowledge DB 151 is configured from a plurality of records, and each record has a number field 1511, a vehicle type field 1512, a date-and-time field 1513, an interruption position field 1514, a first node field 1515, a second node field 1516, a running coordinates field 1517, and an autonomous driving control point field 1518. An identification number of each record is stored in the number field 1511. In the example depicted in FIG. 3, a common number is assigned to a series of records and branch numbers are added thereto for distinction.

Identification information indicating the type of the vehicle from which information described in each record is transmitted is stored in the vehicle type field 1512. In other words, the identification information about the vehicle type stored in the vehicle type field 1512 does not always match identification information about the type of the subject vehicle. Date and time of generation of the interruption information 153 described in each record are stored in the date-and-time field 1513.

Absolute coordinates of the forced interruption in the autonomous control are stored in the interruption position field 1514. Identification information about the first node for the vehicle at the time of recording the interruption information 153 described in each record is stored in the first node field 1515. Identification information about the second node for the vehicle at the time of recording the interruption information 153 described in the record is stored in the second node field 1516.

Absolute coordinates which are created by the server 20 by using the running information contained in the interruption information 153 and along which the vehicle is scheduled to run are stored in the running coordinates field 1517. The example depicted in FIG. 3 illustrates that the vehicle follows the path in an order of coordinates ($\varphi 901$, $\lambda 901$), ($\varphi 902$, $\lambda 902$), ($\varphi 952$, $\lambda 952$), and ($\varphi 903$, $\lambda 903$). Absolute coordinates of the autonomous driving control point calculated by processing to be described later are stored in the autonomous driving control point field 1518.

The high accuracy map 152 contains map information with accuracy necessary for calculation of the path and calculation of the track. The high accuracy map 152 contains, for example, information, for the calculation of the path, about a list of nodes that are points set to correspond to points of intersection, branches, and the like on a road, a list of links that are lines connecting two road nodes aligned along a road, absolute coordinates of each node, a length of each link, and a speed limit on each link. The high accuracy map 152 also contains, for example, information, for the calculation of the track, about positions of road compartment lines on each link, types of the road compartment lines, curvatures of road compartment lines, positions of road signs, and gradients of roads.

The high accuracy map 252 is generally identical to the high accuracy map 152. While the high accuracy map 252 desirably matches the high accuracy map 152, the high accuracy map 252 may have information of the same kind and may differ in accuracy from the high accuracy map 152.

The interruption information 153 contains information about the absolute coordinates of occurrence of forced interruption, the factor ID indicating the factor of the forced interruption, the running information recorded by the recording section 112, the vehicle type of the subject vehicle, and the current date and time. FIG. 4 is a diagram depicting an example of the interruption information 153. The interruption information 153 has an interruption position field 1531, a factor ID field 1532, a date-and-time field 1533, a vehicle type field 1534, and a running information field 1535. The absolute coordinates of occurrence of the forced interruption are stored in the interruption position field 1531. The ID indicating the factor of the interruption in the autonomous driving is stored in the factor ID field 1532. The date and time of the interruption in the autonomous driving are stored in the date-and-time field 1533. The identifier indicating the vehicle type of the subject vehicle is stored in the vehicle type field 1534. A plurality of coordinates of the subject vehicle that has moved by manual driving after the interruption in the autonomous driving are stored in the running information field 1535 in a chronological order.

(Examples of Operations)

Figure 5:
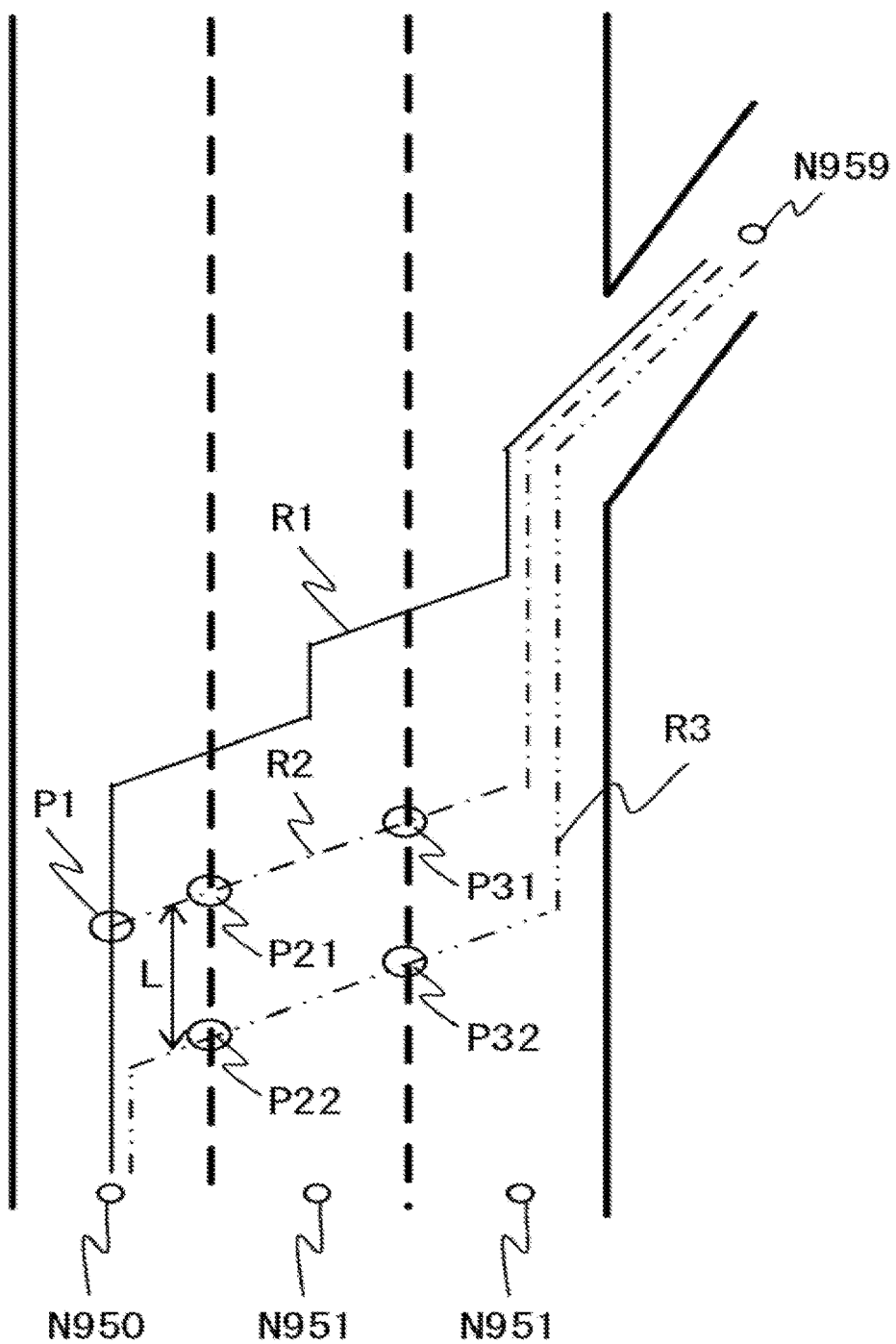
FIG. 5 is a diagram depicting an example of operations.

FIG. 5 is a diagram depicting a situation of running from a node N950 to a node N959 by the autonomous driving. The track generation section 114 of the vehicle-mounted device 10 calculates a track R1 indicated by a solid line in FIG. 5 and controls the vehicle along the track R1. However, the user determines that it takes longer to change lanes by the autonomous driving or that it is appropriate for the autonomous control section 115 to end the autonomous driving from the information acquired by the sensor 16 and the like, and operates the steering wheel to change lanes at a spot P1 an absolute position of which is ($\varphi$801, $\lambda$801). Subsequently, the user arrives at the node N959 after following a trajectory R2 indicated by an alternate long and short dash line in FIG. 5.

In this case, the recording section 112 of the vehicle-mounted device 10 records running information such as absolute coordinates, for example, ($\varphi$901, $\lambda$901) and ($\varphi$902, $\lambda$902), on the R2 indicated by the alternate long and short dash line. The interruption information transmission section 116 then transmits the recorded running information and the interruption information 153 containing ($\varphi$801, $\lambda$801) as the interruption position to the server 20.

Upon receiving the interruption information 153, the server 20 causes the extraction section 217 to calculate the trajectory R2 with use of the running information. The extraction section 217 and the creation section 218 perform different processing in the first mode and the second mode as follows. First, operations of the extraction section 217 and the creation section 218 in the first mode will be described, and then, operations of the extraction section 217 and the creation section 218 in the second mode will then be described. In the first mode, the extraction section 217 sets the interruption position P1 as a control point P1. The creation section 218 then sets the control point P1 as an autonomous driving control point P1 without moving the control point P1, and creates a record in which running coordinates are absolute coordinates on the track R2 including ($\varphi$801, $\lambda$801), the autonomous driving control point is at ($\varphi$801, $\lambda$801), the first node is N950, and the second node, is N959 as a new record in the knowledge DB 251.

In the second mode, the extraction section 217 calculates positions of road compartment lines by using the high accuracy map 252 and calculates control points P21 and P31 that are points of intersection between the trajectory R2 and the road compartment lines. In the second mode, the creation section 218 then calculates a first distance L by a preset scheme and calculates autonomous driving control points by moving the control points by the first distance L backward in a running direction. In other words, the control point P21 is moved to an autonomous driving control point P22, and the control point P31 is moved to an autonomous driving control point P32. Furthermore, in the second mode, the creation section 218 calculates a track R3 passing through the autonomous driving control points P22 and P32 and ranging from the node N950 to the node N959. Finally, in the second mode, the creation section 218 creates a record in which running coordinates are ($\varphi$911, $\lambda$911), ($\varphi$922, $\lambda$922), and the like that are absolute coordinates on the track R3, the first node is N950, and the second node is N959, as a new record in the knowledge DB 251.

As depicted in an upper part of FIG. 5, the first and second modes differ in the control point and the autonomous driving control point, and also differ in the autonomous driving trajectory along which the vehicle runs by the autonomous driving using the created knowledge information. A position of starting the lane change is moved by the first distance L backward in the running direction in the second mode, as compared with the first mode; thus, in the second mode, the autonomous driving is less likely to be cancelled even with occurrence of a traffic congestion or the like. It is noted that the autonomous driving control point P1 on the track R2 corresponds to a spot of changing the running direction meaning a spot of changing a steering angle, while the control points P21 and P31 correspond to spots of changing the running direction meaning spots of changing running lanes.

(Flowcharts)

Figure 6:
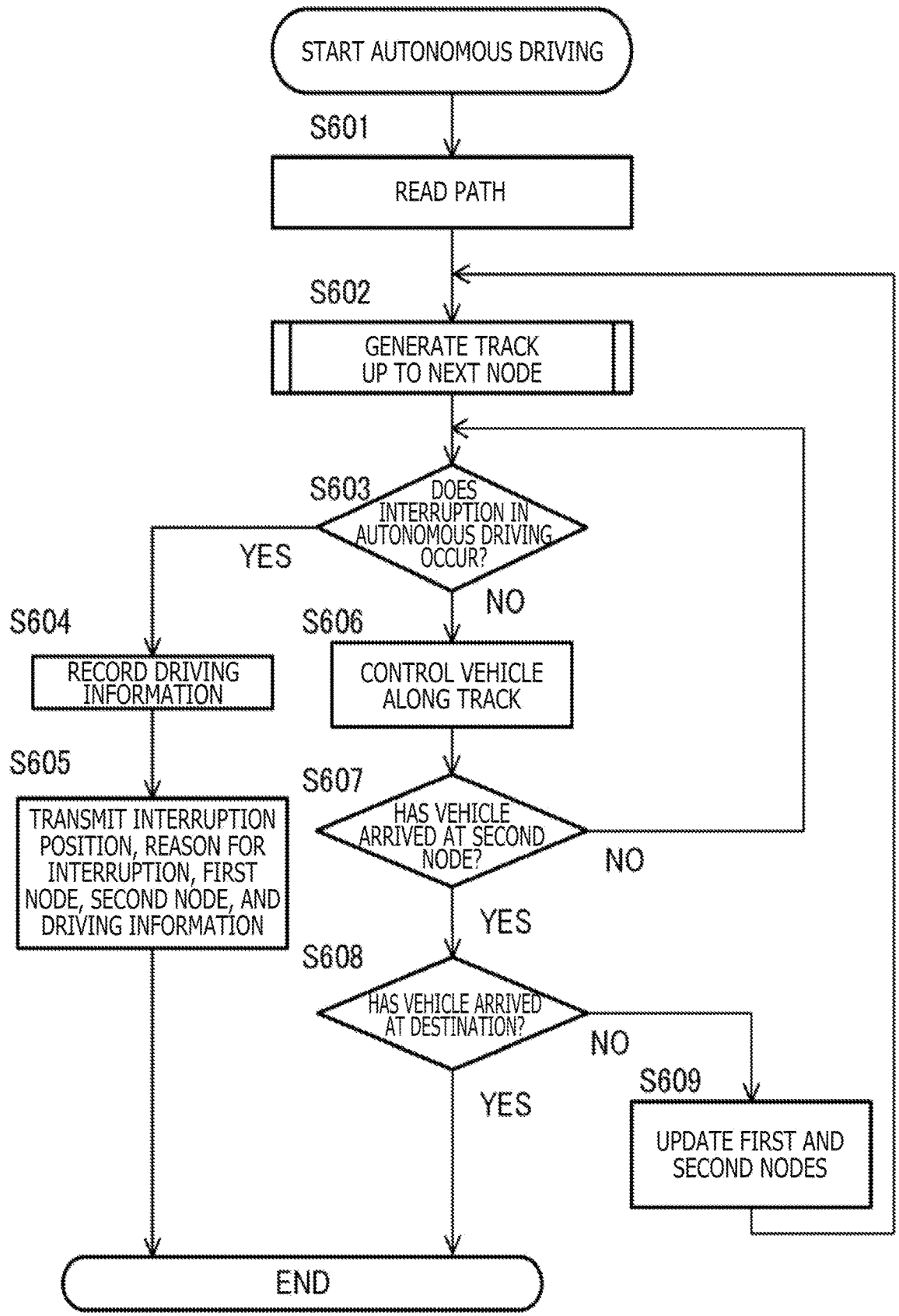
FIG. 6 is a flowchart representing processing by an autonomous control section.

FIG. 6 is a flowchart representing processing by the autonomous control section 115. A subject that executes steps described hereinafter is the CPU 11 in the vehicle-mounted device 10. Path information calculated by the path generation section 113 is input to the autonomous control section 115 in advance, and the processing depicted in FIG. 6 is started.

The autonomous control section 115 first reads the path information calculated by the path generation section 113 in Step S601. In next Step S602, the autonomous control section 115 generates a track up to a next node on the path by using the track generation section 114. While not depicted in FIG. 6, in initial computing of Step S602, the track is calculated in a state in which the spot of departure is set to the first node and a node next to the spot of departure and closer to the destination is set to the second node. Details of Step S602 will be described later with reference to FIG. 7.

In next Step S603, the autonomous control section 115 determines whether or not the forced interruption has occurred in the autonomous driving. In the case of determining that the forced interruption has occurred, that is, any of the manual interruption and the spontaneous interruption has occurred, the autonomous control section 115 goes to Step S604; in the case of determining that the forced interruption has not occurred, the autonomous control section 115 goes to Step S606.

In Step S604, the autonomous control section 115 records driving information by using the recording section 112. It is to be noted, however, that the autonomous control section 115 waits in Step S604 for a predetermined time period or until the subject vehicle travels a predetermined distance since it takes time to collect the driving information. In next Step S605, the autonomous control section 115 transmits the absolute coordinates of the subject vehicle at the time of interruption in the autonomous driving, the reason for the interruption in the autonomous driving, the first and second nodes at the time of interruption in the autonomous driving, and the driving information recorded in Step S604 to the server 20 and ends the processing of FIG. 6.

In Step S606 executed in the case of determining that the forced interruption has not occurred in Step S603, the autonomous control section 115 controls the subject vehicle to run along the track generated in Step S602. It is noted that the autonomous control section 115 may control the subject vehicle to avoid a collision against another vehicle by using the information obtained from the sensor 16 while taking the autonomous driving control point fields 1518 in the knowledge DB 251 into consideration as reference values. In next Step S607, the autonomous control section 115 determines whether or not the subject vehicle has arrived at the second node. In the case of determining that the subject vehicle has arrived at the second node, the autonomous control section 115 goes to Step S608. In the case of determining that the subject vehicle has not arrived at the second node, that is, the subject vehicle is currently running on the track generated in Step S602, the autonomous control section 115 returns to Step S603.

In Step S608, the autonomous control section 115 determines whether or not the subject vehicle has arrived at the destination. The autonomous control section 115 ends the processing depicted in FIG. 6 in the case of determining that the subject vehicle has arrived at the destination, and goes to Step S609 in the case of determining that the subject vehicle has not arrived at the destination. In Step S609, the autonomous control section 115 updates the first and second nodes and returns to Step S602. Specifically, the autonomous control section 115 moves the first and second nodes to respective next nodes closer to the destination.

Figure 7:
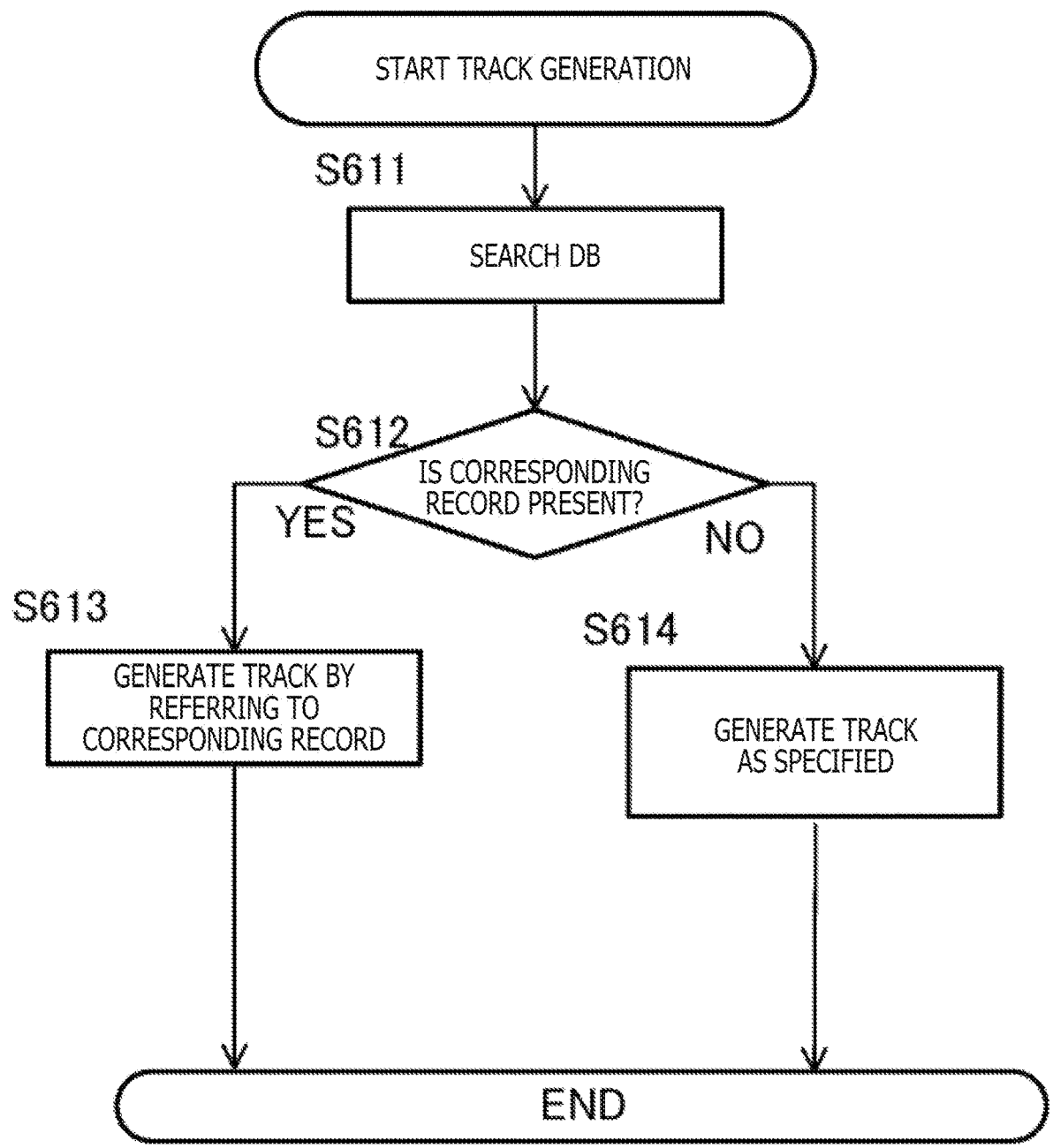
FIG. 7 is a flowchart depicting details of Step S602.

FIG. 7 is a flowchart depicting details of Step S602 of FIG. 6. In Step S611, the autonomous control section 115 specifies a search condition and searches records in the knowledge DB 151. Examples of items of the search condition include the vehicle type, the clock time, the first node, and the second node. Specific examples of the search condition include a condition that the vehicle type of the subject vehicle matches the vehicle type described in the knowledge DB 151 either completely or in a predetermined range, a condition that the current clock time matches the clock time described in the knowledge DB 151 either completely or in a predetermined range, and a condition that the currently set first and second nodes match the first and second nodes described in the knowledge DB 151. In next Step S612, the autonomous control section 115 goes to Step S613 in the case of determining that the record corresponding to the search condition is present, and goes to Step S614 in the case of determining that the corresponding record is not present.

In Step S613, the autonomous control section 115 generates a track by referring to the corresponding record in the knowledge DB 151 and the high accuracy map. Specifically, the autonomous control section 115 includes a trajectory following the running coordinates in the corresponding record in order into the trajectory from the first node to the second node. It is to be noted, however, that the autonomous control section 115 changes the running direction at the coordinates of the autonomous driving control point in a case in which the running coordinates are identical to the coordinates of the autonomous driving control point in the corresponding record in the knowledge DB 151. In Step S614, the autonomous control section 115 calculates the trajectory from the first node to the second node by referring to the high accuracy map.

Figure 8:
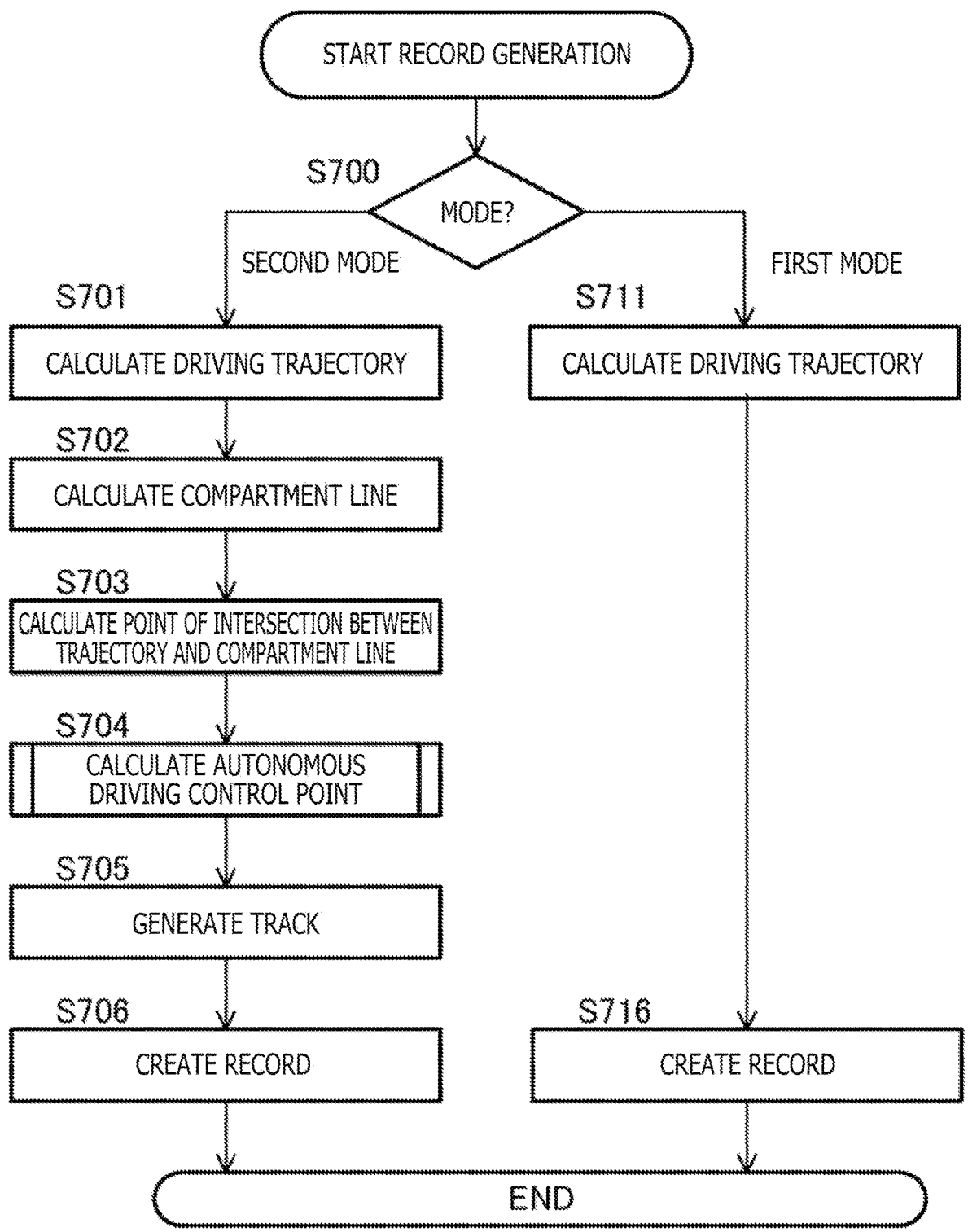
FIG. 8 is a flowchart depicting knowledge DB record generation processing by a server.

FIG. 8 is a flowchart depicting record generation processing in the knowledge DB 251 by the server 20. The server 20 executes the processing depicted in FIG. 8, for example, every time the interruption information 153 is received from the vehicle-mounted device 10. It is noted that Steps S701 to S703 and Step S711 described hereinafter are executed by the extraction section 217, and that Steps S704 to S706 and Step S716 are executed by the creation section 218.

In Step S700, the CPU 21 of the server 20 determines whether the mode is set to the first mode or the second mode. The CPU 21 goes to Step S711 in the case of determining that the mode is set to the first mode, and goes to Step S701 in the case of determining that the mode is set to the second mode.

In Step S701, the extraction section 217 calculates a trajectory of the vehicle from manual driving information contained in the interruption information 153. Since the manual driving information is, for example, a list of position information pieces, that is, information about points, the extraction section 217 calculates information about a line that smoothly connects those points, that is, a trajectory along which the vehicle ran, as absolute coordinates. In next Step S702, the extraction section 217 calculates a white line of the road, that is, a road compartment line, around the interruption position as absolute coordinates on the basis of the high accuracy map. In next Step S703, the extraction section 217 calculates a point of intersection between the trajectory of the vehicle calculated in Step S701 and the road compartment line calculated in Step S702, that is, a control point.

In next Step S704, the creation section 218 creates an autonomous driving control point by moving the control point by a predetermined distance backward in the running direction. A processing distance determination method and a detailed method of creating the autonomous driving control point will be described later. In next Step S705, the creation section 218 calculates a track ranging from the first node to the second node and passing through the autonomous driving control point. This track is generally a track obtained by parallel translation of the trajectory calculated from the manual driving information by a predetermined distance. In next Step S706, the creation section 218 creates a new record in the knowledge DB 251 by using the track generated in Step S705 and the received interruption information 153 and ends the processing of FIG. 8.

Examples of the record created in Step S706 include the following record. A smallest number not used so far is stored in the number field 1511 of the knowledge DB 251. Information about the vehicle type contained in the interruption information 153 is stored in the vehicle type field 1512. Information about the date and time contained in the interruption information 153 is stored in the date-and-time field 1513. Information about the absolute coordinates at which the autonomous driving was interrupted is stored in the interruption position field 1514. Information about the first node and the second node contained in the interruption information 153 is stored in the first node field 1515 and the second node field 1516. Absolute coordinates on the track calculated in Step S705 at intervals of a predetermined distance, for example, at intervals of one meter, are stored in the running coordinates field 1416. The absolute coordinates of the autonomous driving control point are stored in the autonomous driving control point field 1417.

In Step S711, the extraction section 217 calculates the trajectory of the vehicle from the manual driving information contained in the interruption information 153, as in Step S701. In next Step S716, the creation section 218 creates a new record in the knowledge DB 251, in which the autonomous driving control point is the interruption position contained in the interruption information 153 and the running coordinates are the absolute coordinates on the trajectory calculated in Step S711, and ends the processing of FIG. 8. It is to be noted, however, that the running coordinates contain the absolute coordinates of the interruption position.

Figure 9:
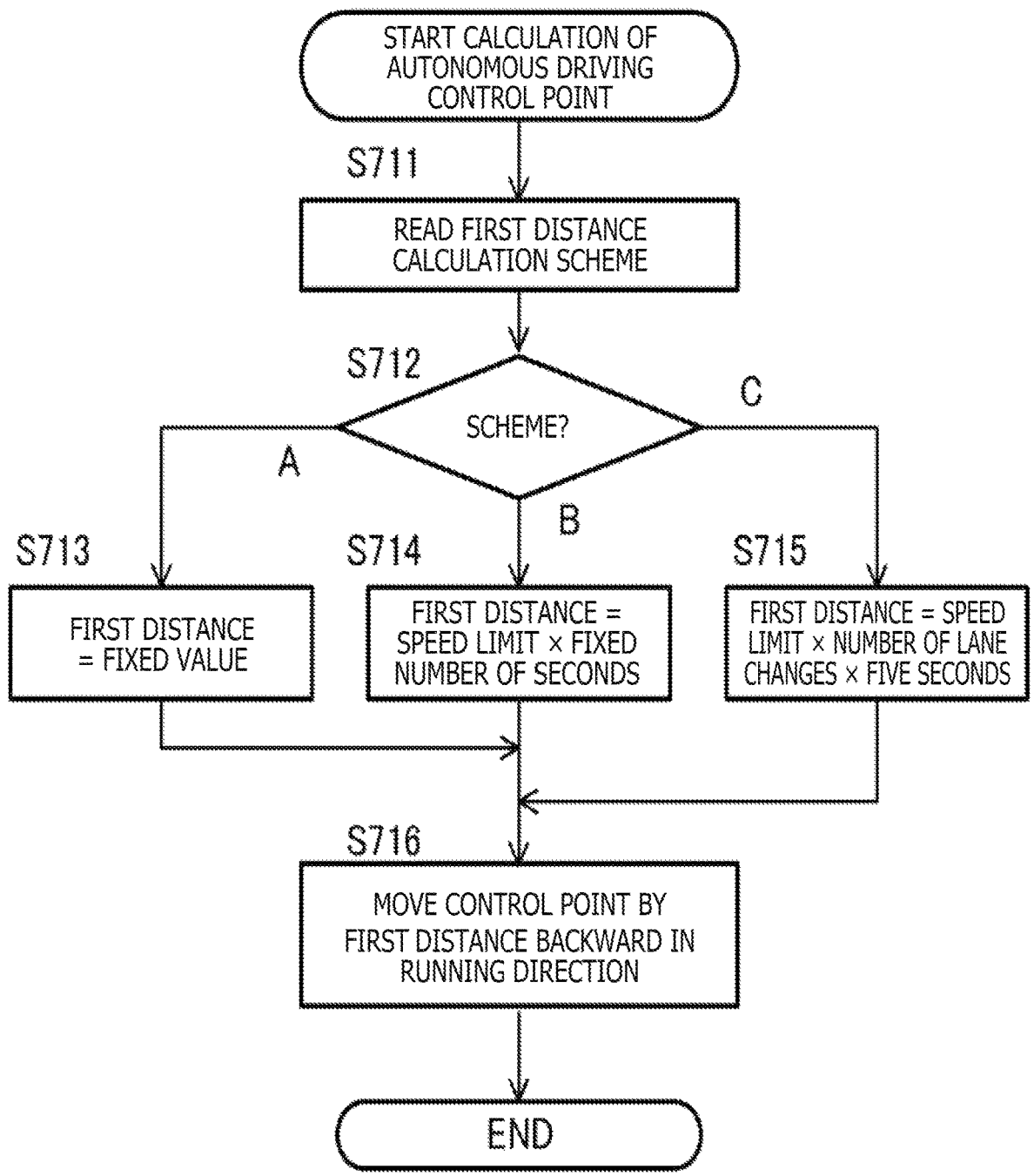
FIG. 9 is a flowchart depicting details of Step S704.

FIG. 9 is a flowchart depicting the details of Step S704 of FIG. 8. In FIG. 9, the creation section 218 first reads a first distance calculation scheme in Step S711. As the calculation scheme, for example, three calculation schemes A to C are set in advance, and which scheme is to be used is recorded in the ROM 22 or the server storage section 25. It is to be noted, however, that which calculation scheme is to be used may be designated on an as-needed basis from outside of the server 20.

In next Step S712, the creation section 218 determines which calculation scheme out of the calculation schemes A to C is read in Step S711. The creation section 218 goes to Step S713 in the case of determining that the calculation scheme "A" is read, goes to Step S714 in the case of determining that the calculation scheme "B" is read, and goes to Step S715 in the case of determining that the calculation scheme "C" is read.

In Step S713, the creation section 218 sets a first distance to a preset fixed value, for example, 20 meters, and goes to Step S716. In Step S714, the creation section 218 sets the first distance to a product between a speed limit on a link on which the first node is present and the preset number of seconds and goes to Step S716. In Step S714, the creation section 218 calculates the first distance as 33 meters in a case, for example, in which the speed limit is 60 km/h and the preset number of seconds is two seconds. It is to be noted, however, that a product between the speed limit at the control point and the preset number of seconds may be used in Step S714.

In Step S715, the creation section 218 calculates the first distance as a product between the speed limit on the link on which the first node is present, the number of lane changes from the first node to the second node, and the preset number of seconds and goes to Step S716. In Step S715, the creation section 218 calculates the first distance as 50 meters in a case, for example, in which the speed limit is 60 km/h, the number of lane changes from the first node to the second node is "3," and the preset number of seconds is one second.

In Step S716, the creation section 218 sets the autonomous driving control point by moving the control point calculated in Step S703 of FIG. 8 by the first distance backward in the running direction and ends the processing depicted in FIG. 9. In the case of presence of a plurality of control points calculated in Step S703, the creation section 218 similarly moves each of the control points by the first distance.

Other Examples of Operations

Figure 10:
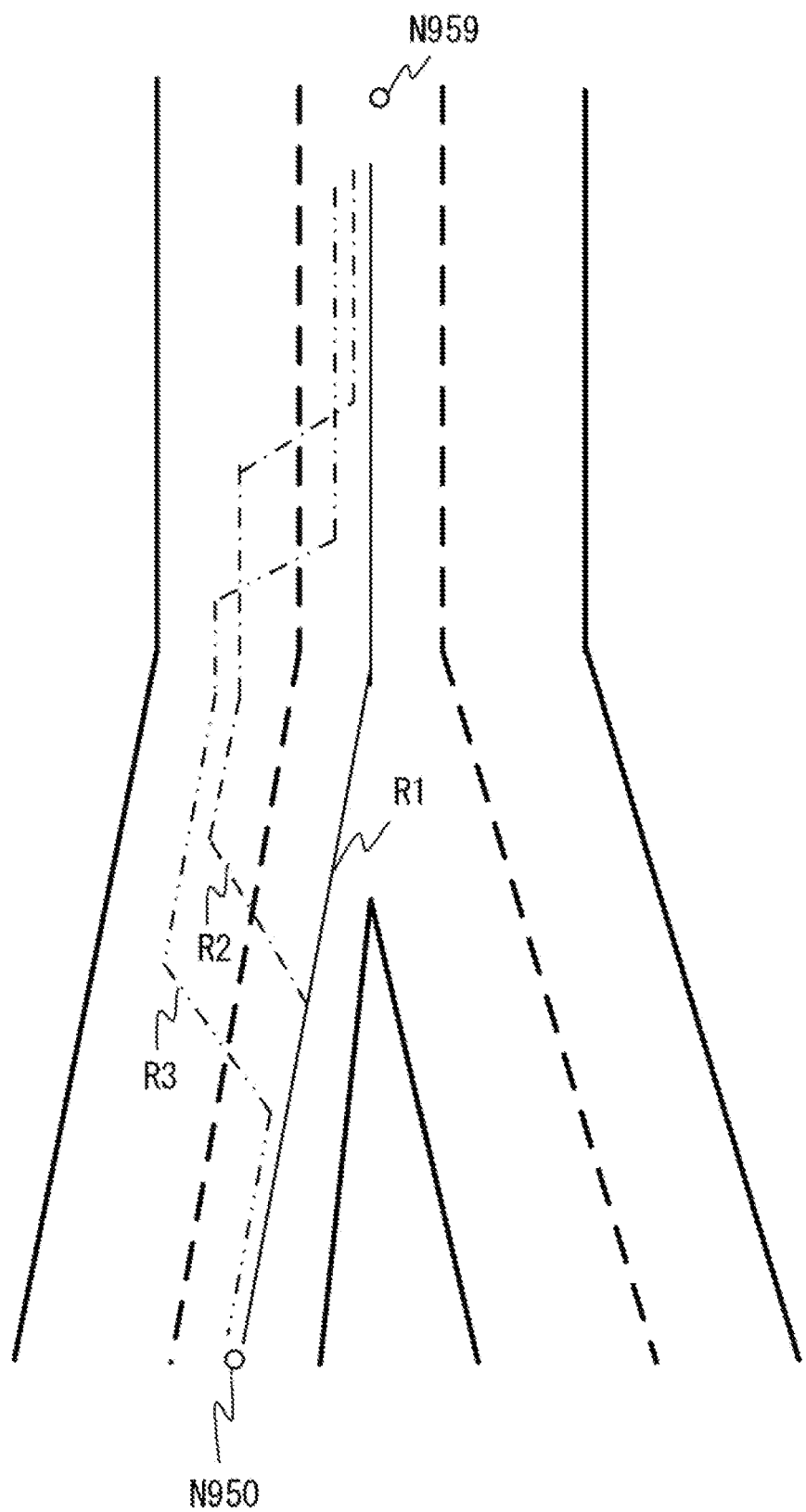
FIG. 10 is a diagram depicting a second example of operations.

FIG. 10 is a diagram depicting a second example of operations according to the first embodiment. FIG. 10 illustrates a scene in which the first node is a node N950 and the second node is a node N959, and in which the vehicle runs upward from the lower side in FIG. 10. Left and right roads merge together in a central portion in FIG. 10. The track generation section 114 calculates a track R1 indicated by a solid line and controls the vehicle along the track R1. However, after the user himself/herself ends the autonomous driving or the autonomous driving is ended based on the sensor information and the like, the user operates the steering wheel to avoid the merger spot and arrives at the node N959 by following a trajectory R2 indicated by an alternate long and short dash line. The interruption information transmission section 116 transmits the interruption information 153 to the server 20, and the server 20 generates knowledge information enabling generation of a track R3 indicated by a chain double-dashed line, that is, a new record in the knowledge DB 251, on the basis of the interruption information 153.

Figure 11:
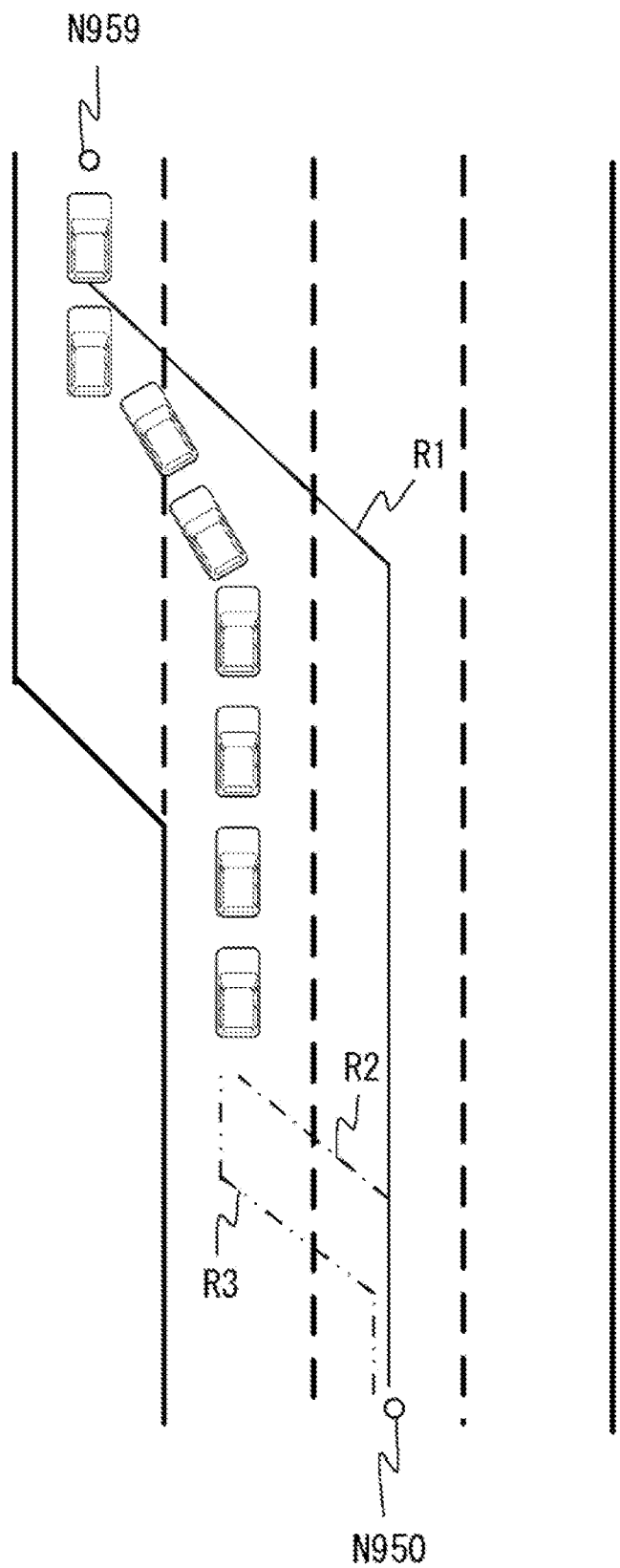
FIG. 11 is a diagram depicting a third example of operations.

FIG. 11 is a diagram depicting a third example of operations according to the first embodiment. FIG. 11 depicts a scene in which the first node is a node N950 and the second node is a node N959. Many vehicles heading for the node N959 are stopped in line. The track generation section 114 calculates a track R1 indicated by a solid line and controls the vehicle along the track R1. At that time, after the sensor detects the line of many vehicles heading for the node N959 and ends the autonomous driving, the user arrives at the node N959 by following a trajectory R2 indicated by an alternate long and short dash line such that the user's vehicle lines up on a tail end of the line of the stopped vehicles. The interruption information transmission section 116 transmits the interruption information 153 to the server 20, and the server 20 generates, in the second mode, knowledge information enabling generation of a track R3 indicated by a chain double-dashed line, that is, a new record in the knowledge DB 251, on the basis of the interruption information 153. It is noted that the server 20 generates, in the first mode, a new record in the knowledge DB 251 enabling generation of the trajectory R2 indicated by the alternate long and short dash line.

(Relation of Data Transmission and Reception)

Here, a vehicle transmitting the interruption information 153 related to generation of a certain record in the knowledge DB 151, that is, any of the knowledge information, will be referred to as a "first vehicle." In addition, a vehicle transmitting the manual driving information related to generation of the knowledge information will be referred to as a "second vehicle," and a vehicle receiving certain knowledge information from the server 20 will be referred to as a "third vehicle." In the example of operations depicted in FIG. 5, the autonomous driving of the subject vehicle is interrupted, information about subsequent user's manual driving is transmitted, and the knowledge information is created; thus, the subject vehicle corresponds to both the first vehicle and the second vehicle. In the example of operations depicted in FIG. 5, if the subject vehicle receives the knowledge information indicating the route R2 or the route R3 from the server 20, the subject vehicle also corresponds to the third vehicle. It is to be noted, however, that unless receiving the knowledge information, the subject vehicle does not correspond to the third vehicle in relation to the knowledge information.

Furthermore, the first vehicle often does not match the second vehicle as follows. For example, a case in which a certain vehicle-mounted device 10 transmits first interruption information 153 about the autonomous driving and in which many other vehicles running from the same first node to the same second node transmit the manual driving information about the real manual driving is supposed. In this case, if the server 20 generates the knowledge information by using average values excluding outliers for the received manual driving information, and if the manual driving information contained in the first interruption information 153 is outliers, the knowledge information is ignored. In this case, therefore, the manual driving information about the vehicle that has generated the first interruption information 153 is not used in the generation of the knowledge information; thus, the subject vehicle corresponds to the first vehicle but does not correspond to the second vehicle. It is noted that whether or not the subject vehicle corresponds to the third vehicle depends on whether or not the subject vehicle receives the knowledge information; thus, the subject vehicle corresponds to both the first vehicle and third vehicle in some cases and corresponds to only the first vehicle in other cases.

As described so far, in the case of paying attention to a certain record in the knowledge DB 251, that is, one knowledge information, the first, second, and third vehicles may be the identical vehicle, the subject vehicle may correspond to only two types out of the first to third vehicles, or the subject vehicle may correspond to only one type out of the first to third vehicles, depending on situations.

According to the first embodiment described above, the following advantages and effects are obtained.

(1) The server 20 that is the computing device includes the server communication section 24 that receives, from the vehicle-mounted device 10 mounted in the first vehicle, the information about the interruption position as the position of interruption in the autonomous driving, that is, the information contained in the interruption position field 1531 in the interruption information 153; and receives, from the vehicle-mounted device mounted in the second vehicle, the manual driving information as the information about the manual driving of the second vehicle in the region of the interruption position, that is, the information contained in the running information field 1535 in the interruption information 153. The server 20 includes the extraction section 217 that extracts, from the manual driving information in the region of the interruption position, the control point as the spot related to the change of the running direction; and the creation section 218 that creates the knowledge information enabling generation of the track for changing the running direction of the vehicle, based on the control point. The server communication section 24 further transmits at least one of the knowledge information and the information indicating the trajectory of the vehicle generated using the knowledge information to the vehicle-mounted device 10 of the third vehicle. The third vehicle is identical to either the first vehicle or the second vehicle or different from both the first vehicle and the second vehicle, and the first vehicle is either identical to or different from the second vehicle. The vehicle-mounted device 10 receiving the knowledge DB 251 can, therefore, realize the autonomous driving at the same spot. In other words, the server 20 can provide the knowledge information enabling the autonomous driving at the spot of previous interruption in the autonomous driving. It is noted that the vehicle-mounted device 10 receiving the knowledge DB 251 from the server 20 is not limited to the vehicle-mounted device 10 transmitting the interruption information 153. In other words, the third vehicle is not necessarily identical to the first vehicle. Owing to this, the autonomous driving of another vehicle mounting the vehicle-mounted device 10 that has not transmitted the interruption information 153 can be realized even in a location where the other vehicle runs for the first time and where the autonomous driving is originally difficult. Moreover, as described above, the second vehicle is not necessarily identical to the first vehicle.

(2) The creation section 218 creates the autonomous driving control point for control over the autonomous driving and creates the knowledge information enabling generation of the track for changing the running direction of the vehicle at the autonomous driving control point. Owing to this, it is possible to generate the track by using the autonomous driving control point.

(3) The first distance is determined by any of the schemes A to C. With the scheme A, the first distance is a preset fixed value. With the scheme B, the first distance is a product between a speed limit on the link where the first node is present and a preset number of seconds. With the scheme C, the first distance is a product between the speed limit on the link where the first node is present, the number of lane changes from the first node to the second node, and the preset number of seconds.

(4) The control point is the spot of intersection between the trajectory of the vehicle and the vehicle compartment line. Owing to this, it is possible to generate the track with reference to the position of changing the running lanes.

(5) The creation section 218 is operable in at least the two modes including the first mode and the second mode. The creation section 218 sets the control point as the autonomous driving control point as it is in the first mode but, in the second mode, creates the autonomous driving control point by moving the control point by the first distance backward in the running direction. Owing to this, in the second mode, it is possible to further enhance continuity of the autonomous driving.

(First Modification)

In the first embodiment described above, the server 20 transmits the entire knowledge DB 251 to all the vehicle-mounted devices 10 connected to the server 20. However, the server 20 may be further configured with a target determination section that determines a target record in the knowledge DB 251 to be transmitted to each vehicle-mounted device 10, and may transmit only part of the knowledge DB 251 to each vehicle-mounted device 10.

Figure 12:
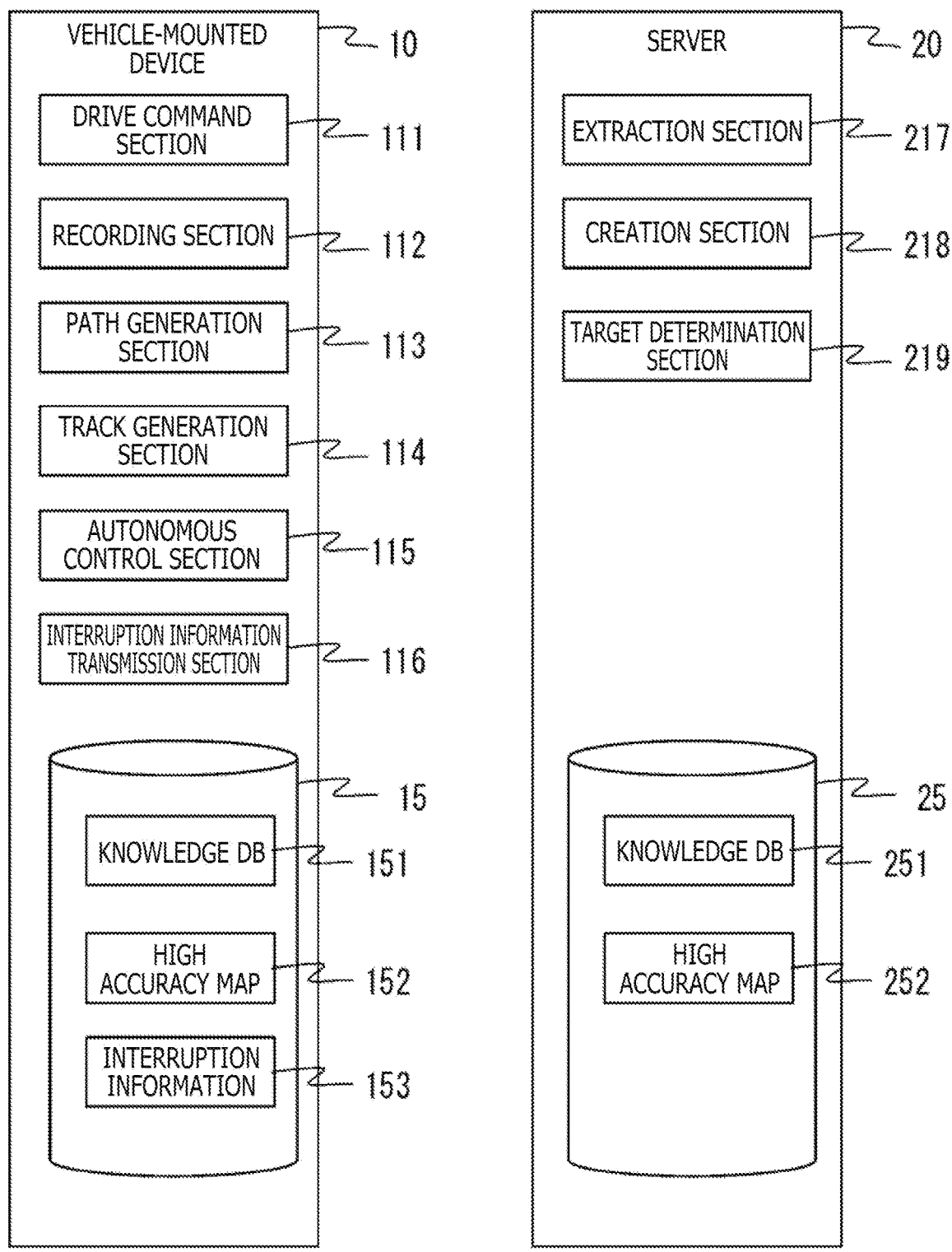
FIG. 12 is a functional configuration diagram of an autonomous driving system according to a first modification.

FIG. 12 is a functional configuration diagram of an autonomous driving system according to a first modification. In FIG. 12, the server 20 is further configured with a target determination section 219, compared with FIG. 2. The target determination section 219 determines a record in the knowledge DB 251 that matches at least one condition among conditions for the vehicle type, the date and time, and the position and transmits the record to each vehicle-mounted device 10 through the server communication section 24. The condition for the vehicle type is, for example, that a value in the vehicle type field 1512 in each record matches the vehicle type of the vehicle mounting the vehicle-mounted device 10 or that the type does not match that of the vehicle mounting the vehicle-mounted device 10 but a difference in dimensions and a weight of a vehicle body is within a predetermined range.

The condition for the date and time is that the date and time stored in the date-and-time field 1513 in each record match the current date and time in at least one of a season, a month, a day of week, and a time zone. The condition for the position is that a difference between a position stored in the interruption position field 1514 in each record and the latest position of each vehicle-mounted device 10 is within a predetermined range. For example, the condition for the position may be a condition that a straight line distance or a distance along the road is within a predetermined distance, or that, when an absolute position is rewritten to an address notation, the address is within a predetermined range, for example, identical in terms of prefecture or smaller municipality.

According to the first modification, the following advantages and effects are obtained.

(6) The server communication section 24 receives information about the vehicle types and the dates and times from the vehicle-mounted devices 10 as part of the interruption information 153. The knowledge information in each record of the knowledge DB 251 contains information in the vehicle type field 1512, the date-and-time field 1513, and the interruption position field 1514 for each of the first vehicle and the second vehicle. The server 20 includes the target determination section 219 that determines a transmission target vehicle-mounted device to which the knowledge information is transmitted on the basis of at least one of comparison of the vehicle type of the third vehicle with the vehicle type contained in the knowledge information, comparison of the current date and time with the date and time contained in the knowledge information, and comparison of the position of the third vehicle with the interruption position contained in the knowledge information. Owing to this, only the knowledge information suited for use in each vehicle-mounted device 10 is transmitted from the server 20 to the vehicle-mounted device 10 of the third vehicle; thus, a communication volume is suppressed, and efficiency for search of the knowledge DB 151 in each vehicle-mounted device 10 is improved.

(Second Modification)

In the first embodiment described above, each record in the knowledge DB 151 contains the first node and the second node. However, information about absolute positions may be stored as an alternative to the respective nodes, and the running direction of the vehicle may be further stored in each record. Moreover, the interruption information transmission section 116 may not always include the factor ID field 1532 in the interruption information 153.

(Third Modification)

In the first embodiment described above, the server 20 generates a record in the knowledge DB 251 every time receiving the interruption information 153 from the vehicle-mounted device 10. However, the server 20 may generate records in the knowledge DB 251 in a lump per predetermined period of time by what is generally called batch processing. In this case, in a case in which a plurality pieces of interruption information 153 having the same combination of the first node and the second node are present, the server 20 can perform grouping by using average values of the respective running coordinates.

(Fourth Modification)

The vehicle-mounted device 10 may include auxiliary information such as information about a line of vehicles present forward of the subject vehicle and traffic information acquired from the outside in the interruption information 153 transmitted to the server 20. Upon receiving the interruption information 153 containing the auxiliary information, the server 20 further provides a field for storing the auxiliary information in the generated record of the knowledge DB 251, and stores the auxiliary information in the field. It is noted that the vehicle-mounted device 10 may take the auxiliary information contained in the knowledge information into account in the generation of the track.

(Fifth Modification)

In the first embodiment described above, the server 20 transmits the knowledge DB 251 to the vehicle-mounted device 10. However, the server 20 may calculate the track and transmit information indicating the track to the vehicle-mounted device 10 as an alternative to transmission of the knowledge DB 251 to the vehicle-mounted device 10.

Figure 13:
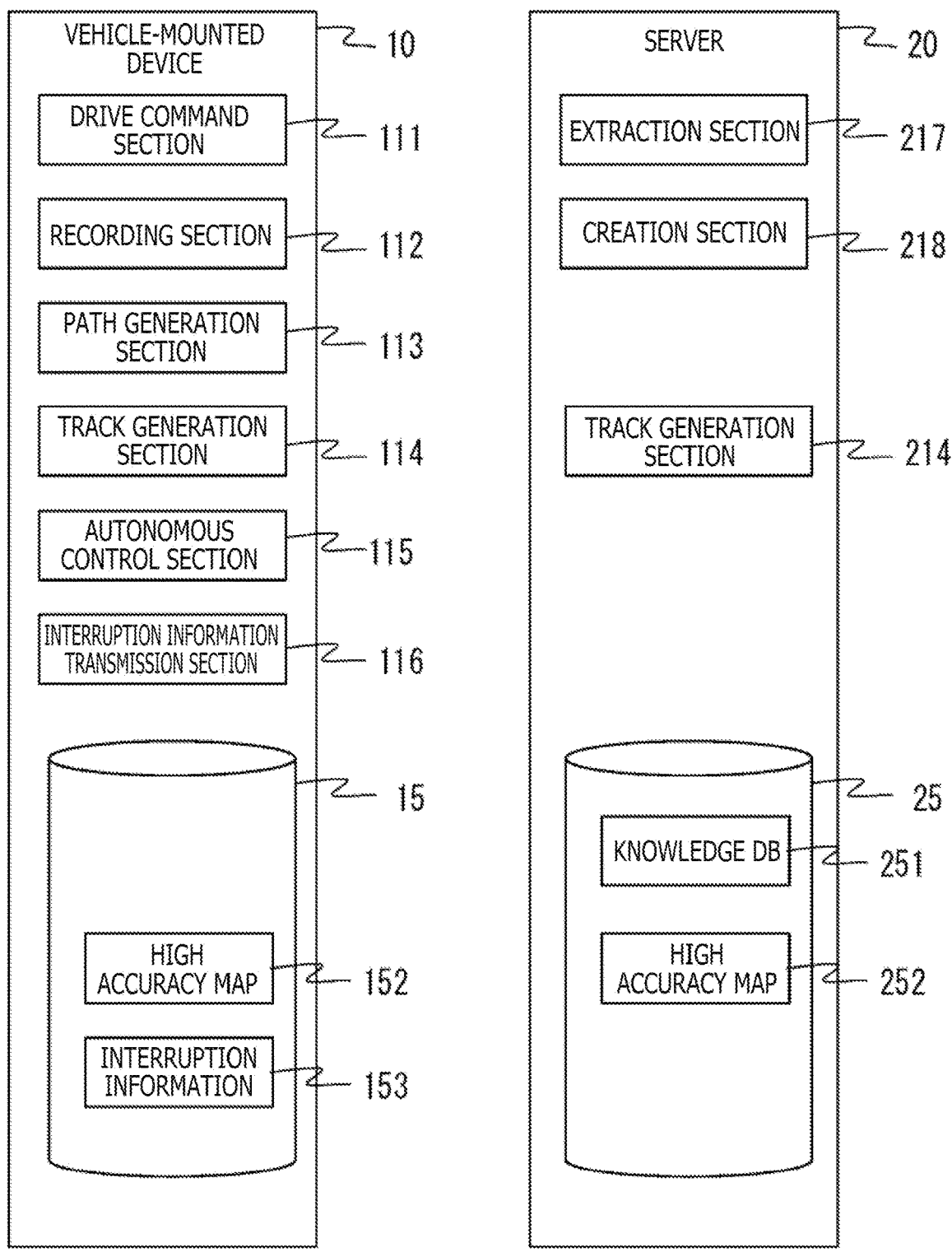
FIG. 13 is a functional block diagram of an autonomous driving system according to a fifth modification.

FIG. 13 is a functional block diagram of an autonomous driving system according to a fifth modification. FIG. 13 differs from FIG. 2 according to the first embodiment in that the server 20 is further configured with a track generation section 214. Furthermore, in FIG. 13, the knowledge DB 151 is not stored in the vehicle-mounted storage section 151. Operations of the track generation section 214 provided in the server 20 are similar to those of the track generation section 114 in the vehicle-mounted device 10 according to the first embodiment.

In the present modification, the vehicle-mounted device 10 transmits the path calculated by the path generation section 113 to the server 20. The track generation section 214 in the server 20 calculates a track by referring to the knowledge DB 251 and the high accuracy map 251 and transmits information about the calculated track to the vehicle-mounted device 10 through the server communication section 24.

(Sixth Modification)

In the first embodiment described above, the vehicle-mounted device 10 transmits the interruption information 153 to the server 20 while including the vehicle type and the date and time in the interruption information 153. However, the vehicle-mounted device 10 may not include at least one of the vehicle type and the date and time in the interruption information 153. In this case, the knowledge DB 251 does not have the field of at least one of the vehicle type and the date and time not contained in the interruption information 153. Furthermore, in the track generation processing, at least one of the vehicle type and the date and time not contained in the interruption information 153 is deleted from the search conditions in Step S611 of FIG. 7.

(Seventh Modification)

In the first embodiment described above, the autonomous driving control point field 1417 is provided in the knowledge DB 251. However, the knowledge DB 251 may not have the autonomous driving control point field 1417. As described in the first embodiment, while the coordinates in the autonomous driving control point field 1417 are necessary for creation of the running coordinates field 1517, the vehicle-mounted device 10 can run by using information in the running coordinates field 1517 without referring to the autonomous driving control point field 1518.

(Eighth Modification)

In the first embodiment described above, the vehicle-mounted devices 10 are identical to each other in configuration. However, the configuration and operations of the vehicle-mounted devices 10 may be different as described hereinafter.

Figure 14:
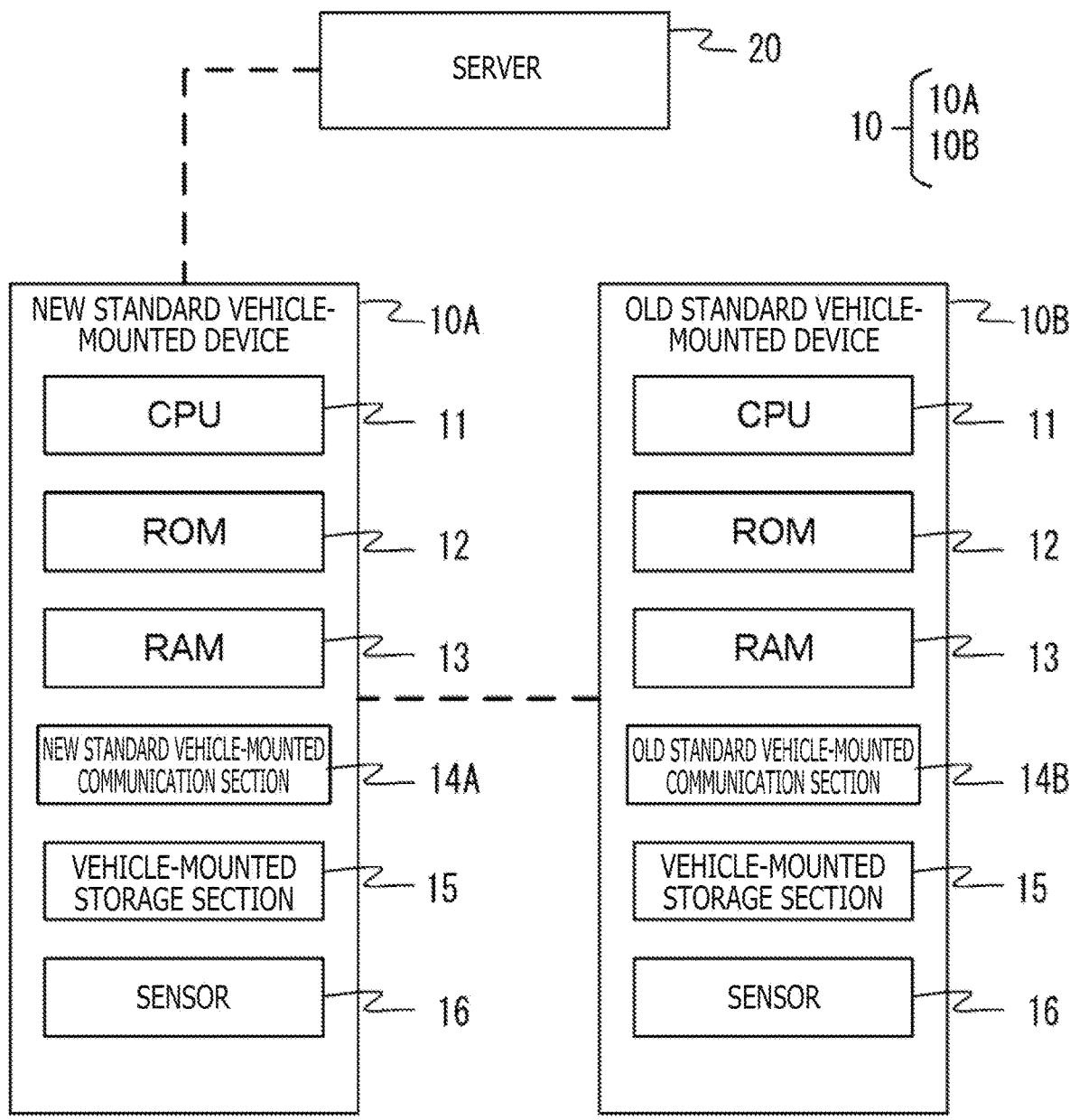
FIG. 14 is a hardware configuration diagram of an autonomous driving system according to an eighth modification.

FIG. 14 is a system configuration diagram depicting an autonomous driving system according to the present modification. It is to be noted, however, that details are omitted in FIG. 14 since the configuration of the server 20 is similar to that in FIG. 1 according to the first embodiment. The vehicle-mounted devices 10 according to the present modification are each classified as a new standard vehicle-mounted device 10A or an old standard vehicle-mounted device 10B. The new standard vehicle-mounted device 10A is configured with a new standard vehicle-mounted communication section 14A compliant with 5G. The old standard vehicle-mounted device 10B is configured with an old standard vehicle-mounted communication section 14B compliant with 4G and 3G that are older communication standards than 5G. Since the new standard vehicle-mounted communication section 14A is compliant with 5G, the new standard vehicle-mounted communication section 14A has advantages of a high communication speed, many simultaneous connections, and small communication delay, compared with the old standard vehicle-mounted communication section 14B. The old standard vehicle-mounted device 10B does not directly communicate with the server 20 but communicates with the server 20 via the new standard vehicle-mounted device 10A.

According to the eighth modification, the following advantages and effects are obtained.

(7) The vehicle-mounted devices 10 are each classified as the old standard vehicle-mounted device 10B or the new standard vehicle-mounted device 10A. The vehicle-mounted communication section 14 provided in the new standard vehicle-mounted device 10A is the new standard vehicle-mounted communication section 14A compliant with 5G. The vehicle-mounted communication section 14 provided in the old standard vehicle-mounted device 10B is the old standard vehicle-mounted communication section 14B compliant with only communication standards older than the 5G. The old standard vehicle-mounted communication section 14B transmits the information about the interruption position and the manual driving information to the server 20 by way of the new standard vehicle-mounted communication section 14A. Owing to this, the server 20 or a base station can collect the interruption information 153 from many vehicle-mounted devices 10 and distribute the knowledge DB 251 to many vehicle-mounted devices 10.

(Ninth Modification)

In the first embodiment described above, the control point is the spot of intersection between the trajectory of the vehicle and the vehicle compartment line. However, the control point may be a spot where the vehicle starts changing the running direction.

(Tenth Modification)

In the first embodiment described above, it is described that the operation mode of the extraction section 217 and the creation section 218 is set to either the first mode or the second mode by the operator of the server 20 in advance. However, the extraction section 217 and the creation section 218 may perform computing in both the first mode and the second mode and create two knowledge DBs 251. In this case, the server 20 may further transmit the knowledge DB 251 created in the operation mode designated by the vehicle-mounted device 10 to the vehicle-mounted device 10.

(Eleventh Modification)

Any of the vehicle-mounted devices 10 connected to the server 20 may include information in only one of the interruption position field 1531 and the running information field 1535 in the interruption information 153. In other words, by not including information in the running information field 1535 in the interruption information 153, the vehicle-mounted device 10 may not correspond to the second vehicle, or by not including information in the interruption position field 1531 in the interruption information 153, the vehicle-mounted device 10 may not correspond to the first vehicle. Moreover, any of the vehicle-mounted devices 10 may not receive the knowledge information from the server 20 and may not correspond to the third vehicle.

(Twelfth Modification)

In a case in which a plurality of pieces of knowledge information to be transmitted are present as the knowledge information suited for use in each of the vehicle-mounted devices 10 described above on the basis of at least one of the comparison with the vehicle type contained in the knowledge information, the comparison of the current date and time with the date and time contained in the knowledge information, and the comparison of the position of the third vehicle with the interruption position contained in the knowledge information, knowledge information as training data obtained by optimizing those pieces of knowledge information may be transmitted to the vehicle-mounted device 10. It is thereby possible to continue the autonomous driving that is more suited for the vehicle-mounted device 10 of the third vehicle and that does not cause a person sitting in the third vehicle to feel uncomfortable.

Second Embodiment

An autonomous driving system according to a second embodiment will be described with reference to FIG. 15. In the following description, differences from the first embodiment will be mainly described while the same constituent elements as those according to the first embodiment are denoted by the same reference characters. Respects that are not specifically described are the same as those according to the first embodiment. The present embodiment differs from the first embodiment in that not the server but the vehicle-mounted device creates the knowledge DB. It is noted that the server may not be present in the present embodiment. Since the hardware configuration of the vehicle-mounted device according to the present embodiment is similar to that according to the first embodiment, description thereof will be omitted.

Figure 15:
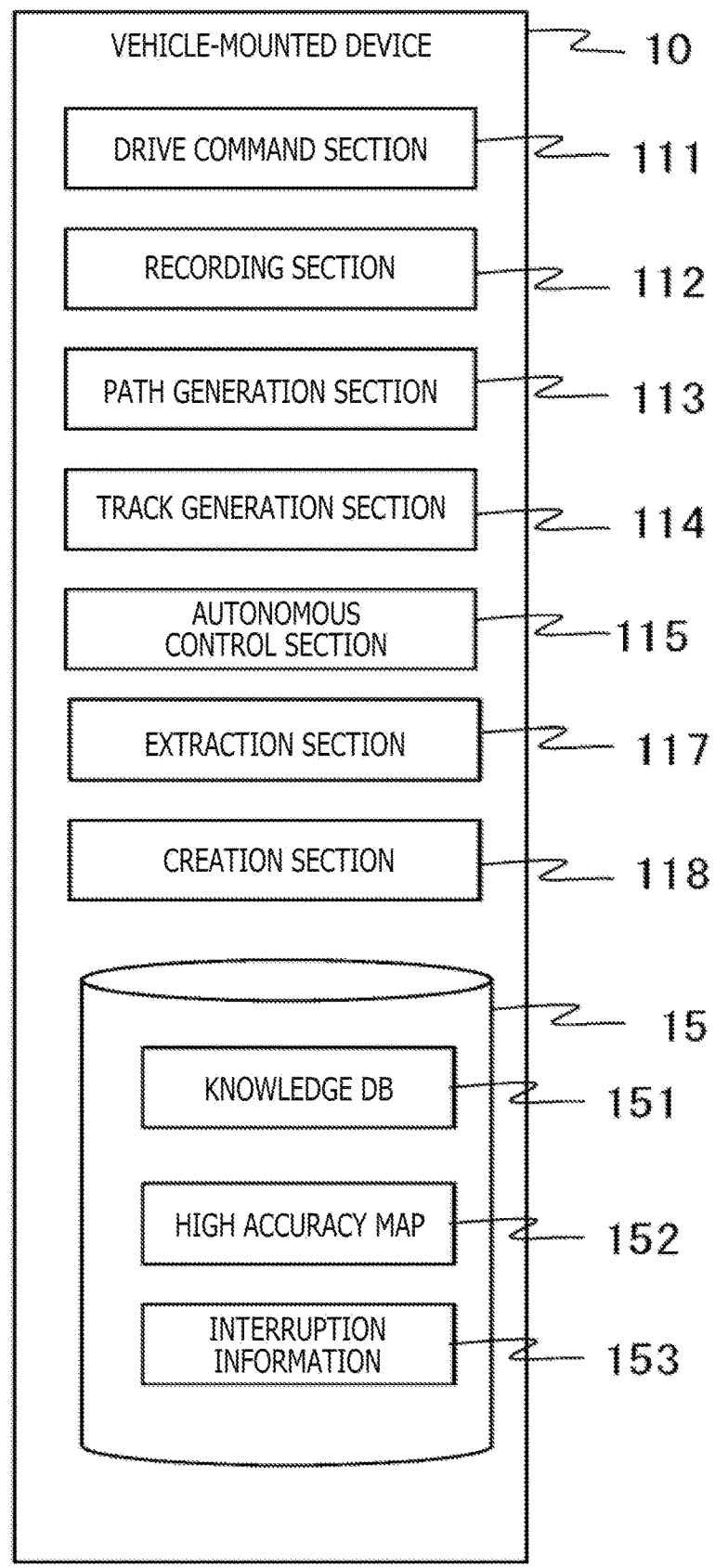
FIG. 15 is a functional configuration diagram of a vehicle-mounted device according to a second embodiment.

FIG. 15 is a functional configuration diagram of a vehicle-mounted device 10-2 according to the second embodiment. The vehicle-mounted device 10-2 according to the second embodiment is configured with an extraction section 117 and a creation section 118, in addition to the configuration according to the first embodiment, as functions thereof. Functions and operations of the extraction section 117 are similar to those of the extraction section 217 in the server 20 according to the first embodiment. Functions and operations of the creation section 118 are similar to those of the creation section 218 in the server 20 according to the first embodiment. An operation mode of the extraction section 117 and the creation section 118 may be set by the user sitting in the subject vehicle, or an operation mode may be designated in advance.

According to the second embodiment described above, the following advantages and effects are obtained.

(8) The vehicle-mounted device 10-2 includes the recording section 112 that records information about the interruption position as the position of interruption in the autonomous driving and information about the manual driving after the interruption in the autonomous driving; the extraction section 117 that extracts, from the manual driving information, the control point for starting the change of the running direction; the creation section 118 that creates the autonomous driving control point for control over the autonomous driving on the basis of the control point, and that creates the knowledge information enabling generation of the track for changing the running direction at the autonomous driving control point; and the track generation section 114 that creates the track of the vehicle by using the knowledge information. Thus, even in an uncommunicable environment, the vehicle-mounted device 10-2 is free from the interruption in the autonomous driving at the time of re-running even at a position at which the autonomous driving was interrupted once.

Third Embodiment

An autonomous driving system according to a third embodiment will be described. In the following description, differences from the first embodiment will be mainly described while the same constituent elements as those according to the first embodiment are denoted by the same reference characters. Respects that are not specifically described are the same as those according to the first embodiment. The present embodiment mainly differs from the first embodiment in that the path on which the autonomous driving is interrupted is not generated. Since hardware configurations of the vehicle-mounted device and the server according to the present embodiment are similar to those according to the first embodiment, description thereof will be omitted.

Since it is unnecessary to record the running information in the present embodiment, a vehicle-mounted device 10-3 may not be configured with the recording section 112. The interruption information 153 in the present embodiment does not contain the running information. Owing to this, the interruption information transmission section 116 transmits the interruption position, the reason for interruption, the first node, and the second node to the server 20 as the interruption information 153.

Since it is unnecessary to calculate the control point, the autonomous driving control point, and the running coordinates in the present embodiment, the server 20 may not be configured with the extraction section 217. Furthermore, the creation section 218 in the present embodiment records the received interruption information 153 as it is in the knowledge DB 251 as a new record.

The path generation section 113 in the vehicle-mounted device 10-3 refers to the knowledge DB 151 at the time of generating a path and excludes a combination of the first node and the second node described in the knowledge DB 151 from the path to be generated.

The path generation section 113 may handle the combination of the first node and the second node described in the knowledge DB 151 as a passing prohibited section at the time of generating the path.

According to the third embodiment, it is possible to avoid interruption in the autonomous driving by generating the path on which the autonomous driving is interrupted.

The configurations of the functional blocks in the embodiments and the modifications described above are given as mere examples. The configurations of some functions depicted as different functional blocks may be integrated, or the configuration represented in one functional block diagram may be divided into two or more functions. Furthermore, the present invention may encompass such a configuration that part of the functions of one functional block is provided in another functional block. Moreover, the hardware configuration in each embodiment is similarly given as a mere example, and each device in each embodiment may be realized by a plurality of devices.

While it is described that the programs are stored in the ROM, not depicted, in the embodiments and the modifications described above, the programs may be stored in a nonvolatile storage area. Furthermore, each vehicle-mounted device or the server may be configured with an input/output interface not depicted, and a program may be read from another device via a medium which the input/output interface can use as needed. The medium here refers to, for example, a storage medium detachably attached to the input/output interface or a communication medium, that is, a network such as wired, wireless, and optical networks or a carrier wave and a digital signal propagated through the network.

The embodiments and the modifications described above may be combined. While the various embodiments and modifications are described above, the present invention is not limited to these contents. Other possible aspects in the range of the technical concept of the present invention are also included in the scope of the present invention.

The contents of disclosure of the following priority basic application are incorporated herein as a reference.

Japanese Patent Application No. 2019-214763 (filed Nov. 27, 2019)

DESCRIPTION OF REFERENCE CHARACTERS

10, 10-2, 10-3: Vehicle-mounted device
10A: New standard vehicle-mounted device
10B: Old standard vehicle-mounted device
14: Vehicle-mounted communication section
14A: New standard vehicle-mounted communication section
14B: Old standard vehicle-mounted communication section
20: Server
24: Server communication section
25: Server storage section
112: Recording section
113: Path generation section
114, 214: Track generation section
116: Interruption information transmission section
117, 217: Extraction section
118, 218: Creation section
151, 251: Knowledge DB
152, 252: High accuracy map
153: Interruption information
219: Target determination section

The invention claimed is:

1. A computing device comprising:
a processor;
a memory coupled to the processor, the memory storing instructions, that when executed, configure the processor to:
receive, from a first vehicle-mounted device mounted in a first vehicle, information about an interruption position indicating a position of interruption of autonomous driving of the first vehicle,
receive, from a second vehicle-mounted device mounted in a second vehicle, manual driving information indicating information about manual driving of the second vehicle including a trajectory of the second vehicle, which includes vehicle behavior information in a region of the interruption position,
identify a control point based on the interruption position being the position of interruption of autonomous driving of the first vehicle where the first vehicle switched from autonomous driving to manual driving,
create knowledge information indicating a trajectory passing through at least a first node and a second node, which are based on the manual driving information, the knowledge information enabling generation of a track of a third vehicle, and
transmit at least one of the knowledge information or information indicating the track of the third vehicle generated using the knowledge information to a third vehicle-mounted device of the third vehicle,
wherein the knowledge information is information for realizing the autonomous driving though spots other than the control point where the autonomous driving was previously interrupted and the knowledge information including information about the track from at least the first node to the second node,
wherein the third vehicle executes autonomous driving based on the information about the track of the third vehicle or a generated track of the third vehicle which is generated based on the knowledge information,
wherein the processor is configured to:
determine the first node as an intersection of the trajectory of the second vehicle and a first lane line,
create a first autonomous driving control point by moving the first node backwards with respect to a running direction of the third vehicle by a first distance, and
create a second autonomous driving control point based on the second node, and wherein the generated track of the third vehicle includes the trajectory that passes through the first autonomous driving control point and the second autonomous driving control point.

2. The computing device according to claim 1, wherein the first distance is determined on a basis of a legal speed limit at the control point and a number of necessary lane changes.

3. The computing device according to claim 1,
wherein the processor is configured to:
receive information about vehicle types and dates and times from the vehicle-mounted devices of the first vehicle, the second vehicle, and the third vehicle,
wherein the knowledge information contains information about the vehicle types, the dates and times, and the interruption position of the first vehicle and the second vehicle, and
wherein the processor is configured to determine a transmission target vehicle-mounted device that is one of the first vehicle-mounted device and the second vehicle-mounted device, to which the knowledge information is transmitted, on a basis of at least one of a comparison of the vehicle type of the vehicle with a vehicle type contained in the knowledge information, a comparison of current date and time with date and time contained in the knowledge information, and a comparison of a position of the vehicle with the interruption position contained in the knowledge information.

4. An autonomous driving system comprising:
a plurality of vehicle-mounted devices respectively mounted in a plurality of vehicles; and
a server that communicates with the vehicle-mounted devices,
wherein each of the vehicle-mounted devices includes:
a vehicle-mounted communication section that transmits information about an interruption position indicating a position of interruption of autonomous driving of a first vehicle among the plurality of vehicles, and manual driving information indicating information about manual driving of a second vehicle among the plurality of vehicles, which includes a trajectory of the second vehicle, wherein the manual driving information includes vehicle behavior information at a region of the interruption position, and
wherein the server includes a processor and a memory, the memory storing instructions that when executed by the processor, configure the processor to:
receive, from the vehicle-mounted devices, the information about the interruption position and the manual driving information,
identify a control point based on the interruption position being the position of interruption of autonomous driving of the first vehicle where the first vehicle switched from autonomous driving to manual driving,
create knowledge information enabling generation of a track for changing a running direction of a third vehicle, among the plurality of vehicles, the knowledge information indicating a trajectory passing through the control point and containing at least a first node and a second node, which are based on the manual driving information, and
transmit at least one of the knowledge information or information indicating a track of the third vehicle generated using the knowledge information to a third vehicle-mounted device, which is one of the plurality of vehicle-mounted devices, of the third vehicle,
wherein the knowledge information is information for realizing the autonomous driving through spots other than the control point where the autonomous driving of the first vehicle was previously interrupted, the knowledge information including information about the track from the first node to the second node,
wherein the third vehicle executes autonomous driving based on the information about the track of the third vehicle or a generated track of the third vehicle which is generated based on the knowledge information,
wherein the processor is configured to:
determine the first node as an intersection of the trajectory of the second vehicle and a first lane line,
create a first autonomous driving control point by moving the first node backwards with respect to a running direction of the third vehicle by a first distance, and
create a second autonomous driving control point based on the second node, and
wherein the generated track of the third vehicle includes the trajectory that passes through the first autonomous driving control point and the second autonomous driving control point.

5. The computing device according to claim 1, wherein the information on the interruption position includes information indicating a line of vehicles present forward of the first vehicle or traffic information acquired externally.

6. The computing device according to claim 5, wherein the processor is configured to create the knowledge information on a basis of the information indicating a line of vehicles present forward of the first vehicle or the traffic information.

7. The computing device according to claim 1, wherein the knowledge information contains information about absolute coordinates of a white line of a road or a surrounding information generated from sensor information.

8. A non-transitory computer readable medium storing a computer program executable by a computer, the program, upon execution by the computer causes the computer to perform steps comprising:
receiving, from a first vehicle-mounted device mounted in a first vehicle, information about an interruption position indicating a position of interruption of autonomous driving of the first vehicle;
receiving, from a second vehicle-mounted device mounted in a second vehicle, manual driving information indicating information about manual driving of the second vehicle including a trajectory of the second vehicle, which includes vehicle behavior information in a region of the interruption position;
identify a control point based on the interruption position being the position of interruption of autonomous driving of the first vehicle where the first vehicle switched from autonomous driving to manual driving;
creating knowledge information indicating a trajectory passing through at least a first node and a second node, which are based on the manual driving information, the knowledge information enabling generation of a track of a third vehicle; and
transmitting at least one of the knowledge information or information indicating a track of the third vehicle generated using the knowledge information to a third vehicle-mounted device of the third vehicle,
wherein the knowledge information is information for realizing the autonomous driving through spots other than the control point where the autonomous driving of the first vehicle was previously interrupted, the knowledge information including information about the track including from the first node to the second node, wherein the third vehicle executes autonomous driving based on the information about the track of the third vehicle or a generated track of the third vehicle which is generated based on the knowledge information,
    wherein the processor is configured to:
    determine the first node as an intersection of the trajectory of the second vehicle and a first lane line,
    create a first autonomous driving control point by moving the first node backwards with respect to a running direction of the third vehicle by a first distance, and
    create a second autonomous driving control point based on the second node, and
wherein the generated track of the third vehicle includes the trajectory that passes through the first autonomous driving control point and the second autonomous driving control point.

9. The non-transitory computer readable medium storing a computer program executable by a computer according to claim 8,
    wherein the processor is configured to:
    create an autonomous driving control point by moving the control point backwards with respect to a running direction of the third vehicle by a first distance, and
    wherein the generated track of the third vehicle includes the trajectory passing through the autonomous driving control point.

10. The non-transitory computer readable medium storing a computer program executable by a computer according to claim 9,
    wherein the first distance is determined on a basis of a legal speed limit at the control point and a number of necessary lane changes.

11. The non-transitory computer readable medium storing a computer program executable by a computer according to claim 8,
    wherein the processor is configured to:
    receive information about vehicle types and dates and times from the vehicle-mounted devices of the first vehicle, the second vehicle, and the third vehicle,
    wherein the knowledge information contains information about the vehicle types, the dates and times, and the interruption position of the first vehicle and the second vehicle, and
    wherein the processor is configured to determine a transmission target vehicle-mounted device that is one of the first vehicle-mounted device and the second vehicle-mounted device to which the knowledge information is transmitted, on a basis of at least one of a comparison of the vehicle type of the vehicle with a vehicle type contained in the knowledge information, a comparison of current date and time with date and time contained in the knowledge information, and a comparison of a position of the vehicle with the interruption position contained in the knowledge information.

12. The non-transitory computer readable medium storing a computer program executable by a computer according to claim 8,
    wherein the information on the interruption position includes information indicating a line of vehicles present forward of the first vehicle or traffic information acquired externally.

13. A method of a computing device, the method comprising:
    receiving, from a first vehicle-mounted device mounted in a first vehicle, information about an interruption position indicating a position of interruption of autonomous driving of the first vehicle;
    receiving, from a second vehicle-mounted device mounted in a second vehicle, manual driving information indicating information about manual driving of the second vehicle including a trajectory of the second vehicle, which includes vehicle behavior information in a region of the interruption position;
    identify a control point as a spot related to a change of a control of a third vehicle;
    creating knowledge information indicating a trajectory passing through at least a first node and a second node, which are based on the manual driving information, the knowledge information enabling generation of a track of the third vehicle; and
    transmitting at least one of the knowledge information or information indicating a track of the third vehicle generated using the knowledge information to a third vehicle-mounted device of the third vehicle,
wherein the knowledge information is information for realizing the autonomous driving through spots other than the control point where the autonomous driving of the first vehicle was previously interrupted, the knowledge information including information about the track from the first node to the second node,
wherein the third vehicle executes autonomous driving based on the information about the track of the third vehicle or a generated track of the third vehicle which is generated based on the knowledge information,
    wherein the processor is configured to:
    determine the first node as an intersection of the trajectory of the second vehicle and a first lane line,
    create a first autonomous driving control point by moving the first node backwards with respect to a running direction of the third vehicle by a first distance, and
    create a second autonomous driving control point based on the second node, and
wherein the generated track of the third vehicle includes the trajectory that passes through the first autonomous driving control point and the second autonomous driving control point.

14. The method according to claim 13,
    wherein the processor is configured to:
    create an autonomous driving control point by moving the control point backwards with respect to a running direction of the third vehicle by a first distance, and
    wherein the generated track of the third vehicle includes the trajectory passing through the autonomous driving control point.

15. The method according to claim 14,
    wherein the first distance is determined on a basis of a legal speed limit at the control point and a number of necessary lane changes.

16. The method according to claim 13,
    wherein the processor is configured to:
    receive information about vehicle types and dates and times from the vehicle-mounted devices of the first vehicle, the second vehicle, and the third vehicle,
    wherein the knowledge information contains information about the vehicle types, the dates and times, and the interruption position of the first vehicle and the second vehicle, and
    wherein the processor is configured to determine a transmission target vehicle-mounted device that is one of the first vehicle-mounted device and the second vehicle-mounted device to which the knowledge information is transmitted, on a basis of at least one of a comparison of the vehicle type of the vehicle with a vehicle type contained in the knowledge information, a comparison of current date and time with date and time contained in the knowledge information, and a comparison of a position of the vehicle with the interruption position contained in the knowledge information.

17. The method according to claim 13,
wherein the information on the interruption position includes information indicating a line of vehicles present forward of the first vehicle or traffic information acquired externally.

18. A vehicle-mounted device comprising:
a processor;
a memory coupled to the processor, the memory storing instructions, that when executed, configure the processor to:
execute autonomous driving of the vehicle,
record information about an interruption position as a position of interruption in autonomous driving and manual driving information as information about manual driving after the interruption in the autonomous driving, wherein the manual driving information includes vehicle behavior information,
identify a control point as a spot related to a change of a running direction by using the manual driving information,
create knowledge information indicating a trajectory passing through at least a first node and a second node, which are based on the manual driving information, and
generate a track of the vehicle by using the knowledge information and execute autonomous driving based on the generated track,
wherein the knowledge information is information for realizing the autonomous driving through spots other than the control point where the autonomous driving was previously interrupted, the knowledge information including information about the track from the first node to the second node,
wherein the processor is configured to:
determine the first node as an intersection of the trajectory of the second vehicle and a first lane line,
create a first autonomous driving control point by moving the first node backwards with respect to a running direction of the third vehicle by a first distance, and
create a second autonomous driving control point based on the second node, and
wherein the generated track of the third vehicle includes the trajectory that passes through the first autonomous driving control point and the second autonomous driving control point.

\* \* \* \* \*